US009146317B2

(12) United States Patent
Pandharkar et al.

(10) Patent No.: US 9,146,317 B2
(45) Date of Patent: *Sep. 29, 2015

(54) METHODS AND APPARATUS FOR ESTIMATION OF MOTION AND SIZE OF NON-LINE-OF-SIGHT OBJECTS

(75) Inventors: Rohit Pandharkar, Pune (IN); Andreas Velten, Madison, WI (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 681 days.

This patent is subject to a terminal disclaimer.

(21) Appl. No.: 13/479,185

(22) Filed: May 23, 2012

(65) Prior Publication Data

US 2012/0300062 A1  Nov. 29, 2012

Related U.S. Application Data

(60) Provisional application No. 61/489,239, filed on May 23, 2011.

(51) Int. Cl.
*G01S 17/58* (2006.01)
*G01S 17/89* (2006.01)

(52) U.S. Cl.
CPC ........ *G01S 17/58* (2013.01); *G01S 17/89* (2013.01)

(58) Field of Classification Search
CPC ....... G01S 7/481; G01S 17/89; G01S 7/4865; G01S 17/58; G01S 7/4808; H04N 3/02; H04N 5/2256; H04N 13/0253; G01B 11/002; G01B 11/2513
USPC .................................................. 348/46, 135
See application file for complete search history.

(56) References Cited

U.S. PATENT DOCUMENTS

| | | | | |
|---|---|---|---|---|
| 8,749,619 | B2* | 6/2014 | Kirmani et al. | 348/46 |
| 2003/0007159 | A1* | 1/2003 | Franke et al. | 356/604 |
| 2003/0235327 | A1* | 12/2003 | Srinivasa | 382/104 |
| 2007/0070201 | A1* | 3/2007 | Yokomitsu et al. | 348/169 |
| 2010/0278008 | A1* | 11/2010 | Ammar | 367/7 |

(Continued)

OTHER PUBLICATIONS

"Looking Around the Corner using Transient Imaging" 2009 IEEE 12th International Conference on Computer Vision (ICCV), Kirmani et al.*

(Continued)

*Primary Examiner* — Sath V Perungavoor
*Assistant Examiner* — Nathnael Aynalem
(74) *Attorney, Agent, or Firm* — Stephen R. Otis

(57) ABSTRACT

In exemplary implementations of this invention, a time of flight camera (ToF camera) can estimate the location, motion and size of a hidden moving object, even though (a) the hidden object cannot be seen directly (or through mirrors) from the vantage point of the ToF camera (including the camera's illumination source and sensor), and (b) the object is in a visually cluttered environment. The hidden object is a NLOS (non-line-of-sight) object. The time of flight camera comprises a streak camera and a laser. In these exemplary implementations, the motion and absolute locations of NLOS moving objects in cluttered environments can be estimated through tertiary reflections of pulsed illumination, using relative time differences of arrival at an array of receivers. Also, the size of NLOS moving objects can be estimated by back-projecting extremas of NLOS moving object time responses.

20 Claims, 24 Drawing Sheets

(56) References Cited

U.S. PATENT DOCUMENTS

2012/0075423 A1    3/2012  Kirmani et al.
2013/0100250 A1*   4/2013  Raskar et al. .................. 348/46

OTHER PUBLICATIONS

A. Kirmani, T. Hutchinson, J. Davis, R. Raskar, Looking Around the Corner Using Transient Imaging, ICCV 2009, Proceedings of 2009 IEEE 12th International Conference on Computer Vision, 2009, pp. 159-166.

A. Kirmani, Femtosecond Transient Imaging, MIT Masters Thesis, Aug. 2010.

S. Seitz, Y. Matsushita, K. Kutulakos, A Theory of Inverse Light Transport, ICCV 2005, Proceedings of the 10th International Conference on Computer Vision, vol. 2, pp. 1440-1447, IEEE Computer Society, Washington, DC, USA, 2005.

A. Sume, M. Gustafsson, A. Janis, S. Nilsson, J. Rahm, A. Orbom, Radar detection of moving objects around corners, Radar Sensor Technology XIII, edited by Kenneth I. Ranney, Armin W. Doerry, Proc. of SPIE vol. 7308, 73080V, SPIE 2009.

B. Chakraborty, Y. Li, J. Zhang, T. Trueblood, A. Papandreou-Suppappola, D. Morrell, Multipath Exploitation with Adaptive Waveform Design for Tracking in Urban Terrain, ICASSIP 2010, Proceedings of 2010 IEEE International Conference on Acoustics Speech and Signal Processing, Mar. 2010, pp. 3894-3897.

* cited by examiner

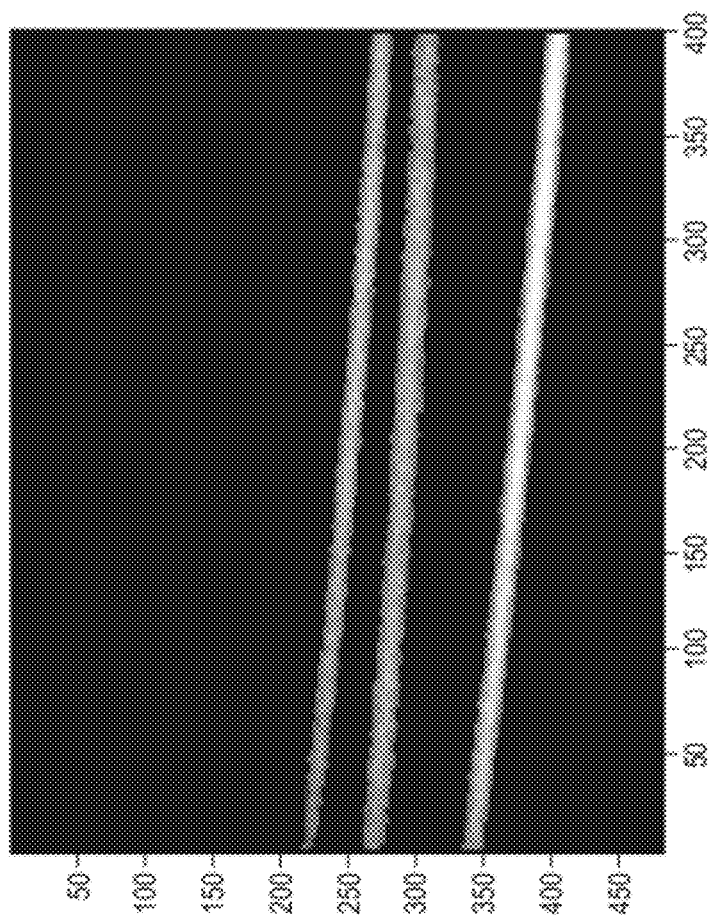

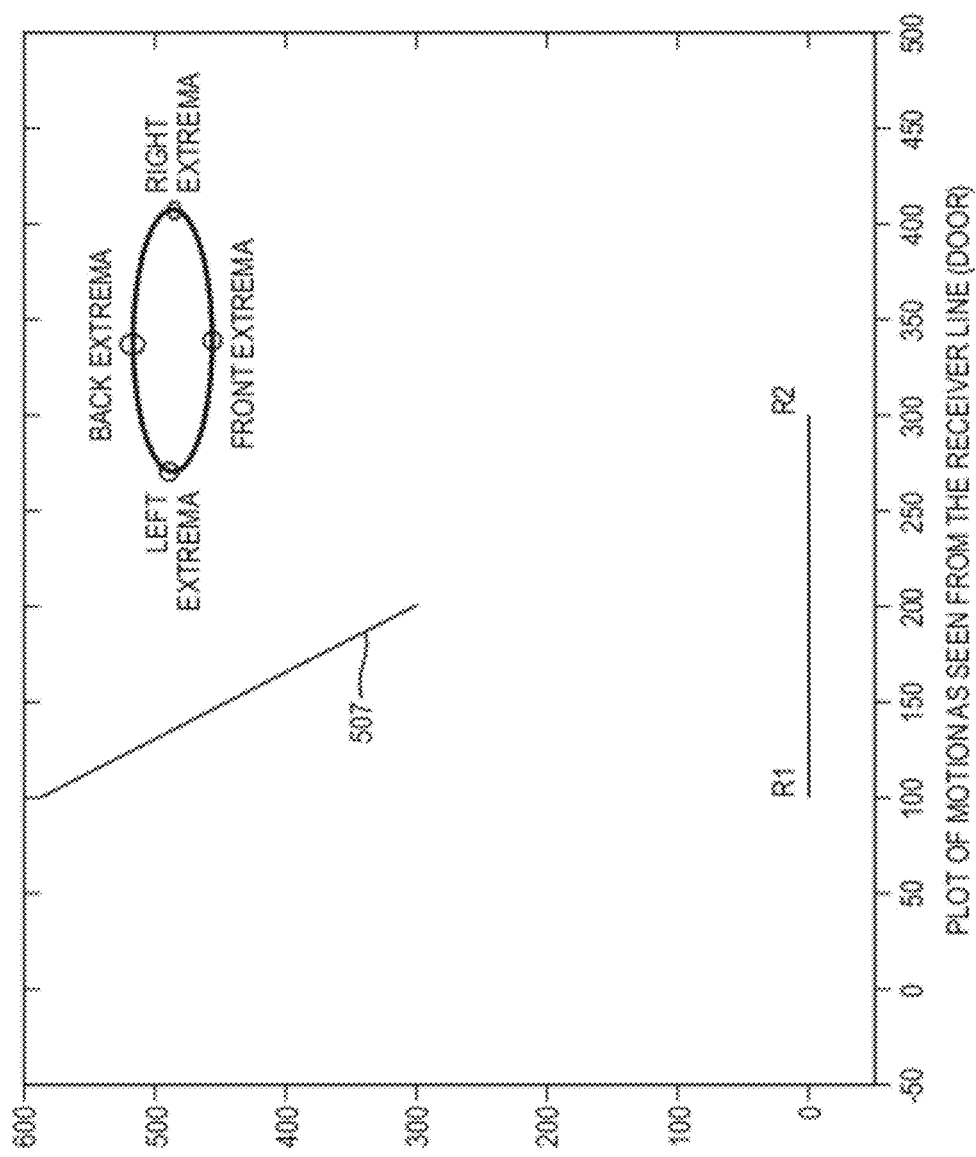

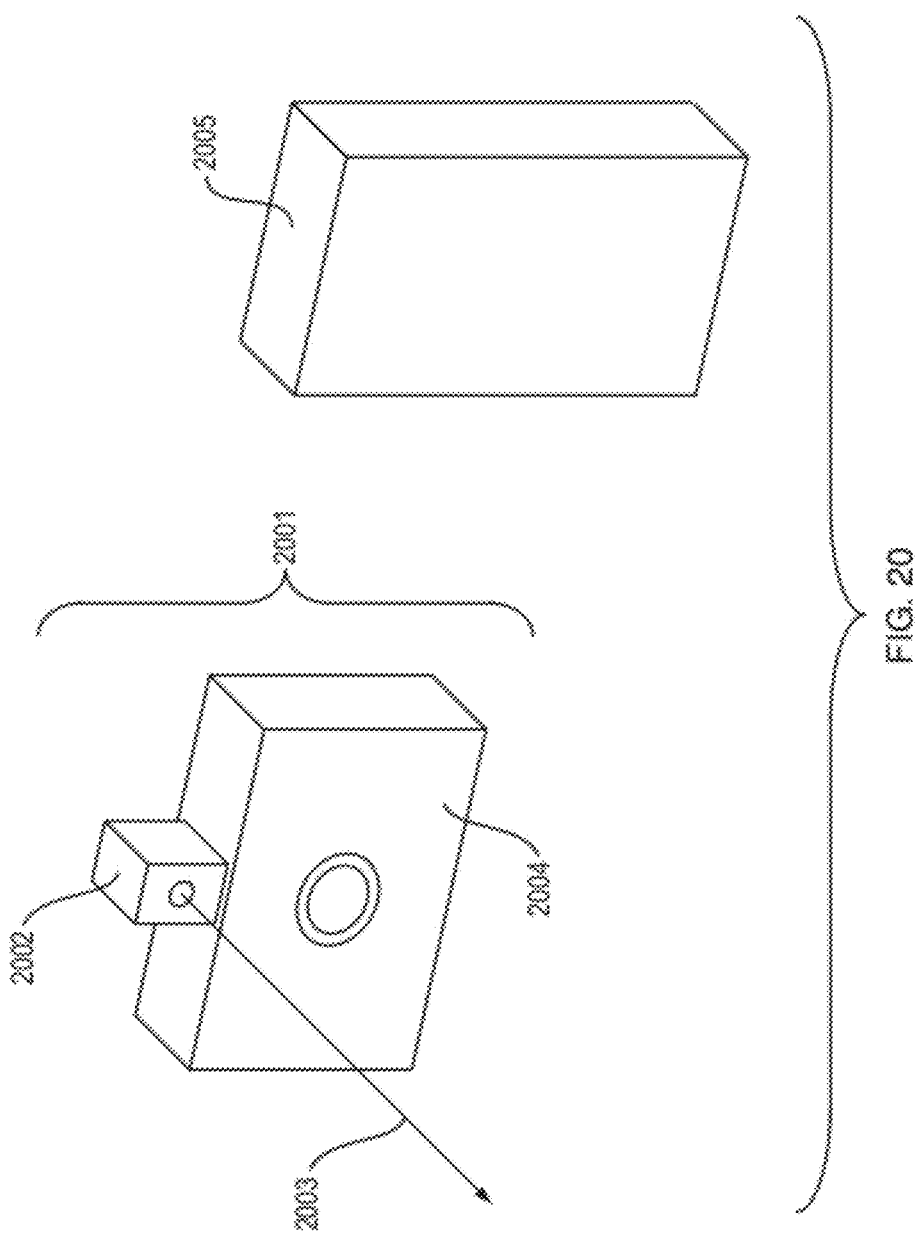

US 9,146,317 B2

METHODS AND APPARATUS FOR ESTIMATION OF MOTION AND SIZE OF NON-LINE-OF-SIGHT OBJECTS

RELATED APPLICATIONS

This application claims the benefit of United States Provisional Application Ser. No. 61/489,239, filed May 23, 2011, the entire disclosure of which is herein incorporated by reference.

STATEMENT REGARDING FEDERALLY SPONSORED RESEARCH OR DEVELOPMENT

This invention was made with U.S. government support under Grant Number N66001-10-1-4041, awarded by the Defense Advanced Research Projects Agency. The government has certain rights in this invention.

FIELD OF THE TECHNOLOGY

The present invention relates generally to time-of-flight cameras.

SUMMARY

In exemplary implementations of this invention, a time of flight (ToF) camera can estimate the location, motion and size of a hidden moving object, even though (a) the hidden object cannot be seen directly (or through mirrors) from the vantage point of the ToF camera (including the camera's light source and light sensor), and (b) the object is in a visually cluttered environment. As used herein, an object is "non-line-of-sight" or "NLOS" if it is so hidden from the ToF camera.

The ToF camera comprises a laser and a streak camera. For example, the laser may comprise an ultra short pulse laser (e.g., in the femto-second range), and the streak camera may have pico-second time resolution (approximately a trillion frames a second).

In exemplary implementations, the motion and absolute locations of NLOS moving objects in cluttered environments can be estimated through tertiary reflections of pulsed illumination, using relative time differences of arrival at an array of receivers. This approach can accommodate global uncalibrated time bias. Also, the size of NLOS moving objects can be estimated by backprojecting extremas of NLOS moving object time responses.

In an illustrative test of a prototype of this invention, the test scene includes (a) a hidden, non-line-of-sight (NLOS) moving object, (b) a secondary diffuse surface (sometimes called a "transreceiver" wall) that can look at the target object, and (c) a laser and a streak camera, which cannot directly look at target object, but can look at the secondary diffuse surface that in turn can look at the target object. In this test, a short pulse laser is aimed at a secondary transreceiver wall. The laser beam is reflected from this wall to the object and back, towards the streak camera, thus creating a multi-path analysis problem.

The following steps may be used to estimate the motion and size of non-line-of-sight (NLOS) moving objects in cluttered environments. A phased-array may detect relative times of arrival of light, after the light reflects from a grid of points on a diffuse surface. Space-time impulse responses for successive frames may be subtracted, in order to separate responses of NLOS moving objects from those resulting from the cluttered environment. The line-of-sight scene geometry may be reconstructed, the space of wavefronts may be analyzed using the phased array, and a constrained least squares problem may be solved to recover the NLOS target location. The target's motion vector may be recovered, even in the presence of uncalibrated time and pose bias. In addition, the upper bound on the size of the target can be computed by backprojecting the extremas of the time profiles.

In exemplary implementations, this invention can track targets inside rooms despite opaque occluders and multipath responses. This has numerous practical applications in search and rescue, medicine and defense.

In a prototype of this invention, centimeter accurate results have been obtained.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

In FIGS. 3A to 3E, the response from location P and response from location Q are extracted from the two frames by taking a difference of two frames, and then taking the positive and negative values as the two separated streaks, respectively. FIG. 3A shows Frame 1. FIG. 3B shows Frame 2. FIG. 3C shows the difference between Frame 1 and Frame 2. FIG. 3D shows the response from Position P. FIG. 3E shows the response from Position Q.

FIG. 4A shows a forward model for phased array based capture. FIG. 4B shows the locus of differential time-of-arrival wavefront. FIG. 4C shows estimated object localization using constrained least squares.

FIGS. 5, 7, and 9 show different extrema configurations that correspond to the different streak patterns in FIGS. 6, 8 and 10. These streak patterns were captured by a streak camera in a prototype of this invention.

FIG. 20 is a high level diagram of some hardware elements.

The above Figures illustrate some illustrative implementations of this invention, or provide information that relates to those implementations. However, this invention may be implemented in many other ways. The above Figures do not show all of the details of this invention.

DETAILED DESCRIPTION

In exemplary implementations of this invention, a time of flight imaging system uses a pico-second time-resolved camera and a femto-second pulsed laser to detect space time light propagation in a scene. Data gathered by this imaging system is used to perform multi-path light transport analysis to track non-line-of-sight (NLOS) moving objects in cluttered environments. The camera can record streak images (space-time impulse responses). Using these streak images, one or more processors can estimate location, size and velocity of the hidden moving objects.

In exemplary implementations, space-time capture of a moving object is time-gated, masking responses from the background clutter.

Figure 1:
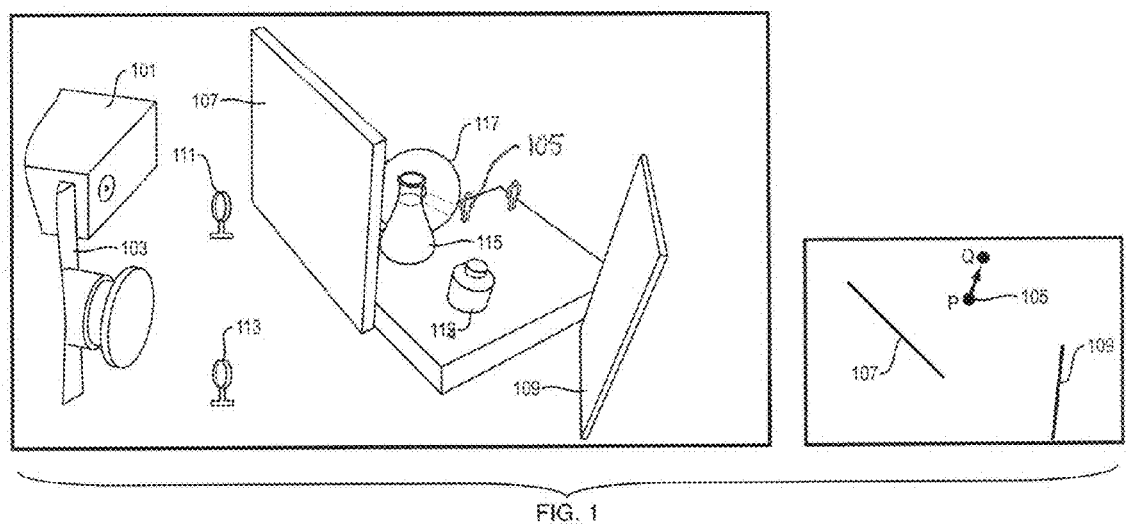
FIG. 1 shows a prototype of this invention. The prototype can be employed to estimate the size and motion of a moving object that is hidden behind an occluding wall.

FIG. 1 shows a prototype of this invention. The prototype can be employed to estimate the size and motion of a moving object 105 that is hidden behind an occluding wall 107. For example, in FIG. 1, the object 105 is a human-shaped figure that is moving through a visually cluttered environment. The cluttered environment comprises a compact disk 117 (diffractive reflection), metallic cylinder 118 (specular reflection) and transparent water container 115 (refraction).

In the example shown in FIG. 1, the moving object 105 cannot be seen directly (or through mirrors) from the vantage point of a short pulsed laser 101 or a streak camera 103. The laser 101 shines on a diffusely reflecting wall (a "transreceiver" wall) 109. The transreceiver wall 109 plays the role of a secondary transmitter of light towards moving object as well as primary receiver of light coming back from the object. The streak camera 103 records the space-time response over a line on the transreceiver wall 109, for the time window of transient response. By recording two such frames separated by known time T, both the size and motion of the moving object in flatland can be estimated. Steering mirrors 111, 113 steer the laser beam as it travels from the laser 101 to the transreceiver wall 109.

In exemplary implementations of this invention, a diffuse scene feature is visible to both to the target and to the time-of-flight camera. For example, in FIG. 1, the diffuse scene feature is the transreceiver wall 109. The laser 101 sends a short pulse or burst of signal and the streak camera 103 captures the response at a finer time resolution.

Figure 2:
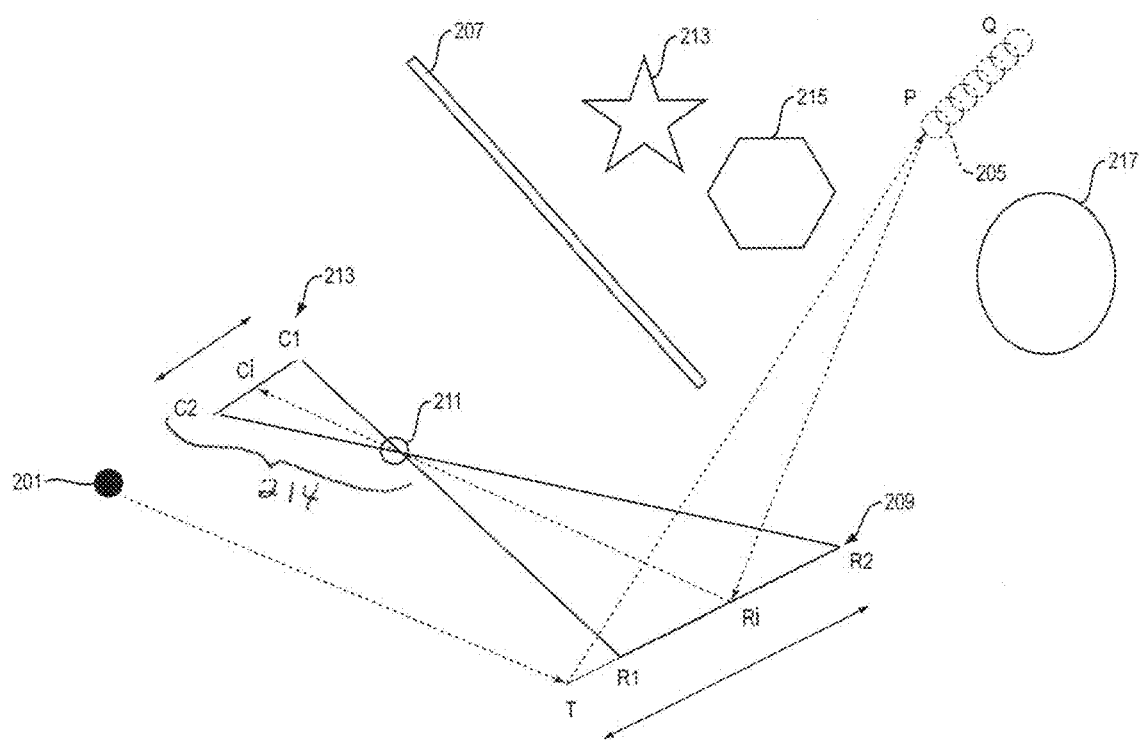
FIG. 2 is a schematic diagram of multi-path light transport.

FIG. 2 is a schematic diagram of multi-path light transport, in a prototype implementation of this invention. In FIG. 2, light pulses from a laser 201 illuminate an object 205 as the object 205 moves from position P to Q. The laser light travels from the laser 201 to a diffusely reflecting transreceiver wall 209, then to the moving object 205. On the return trip, the light travels from a moving object 205 to the transreceiver wall 209, and then to the streak camera 214. Because of an occluding wall 207, the moving object 205 cannot be seen directly from the laser 201 or the camera 214.

As light travels back from the moving object 205, the light reflects off of a point $R_i$ in the transreceiver wall 209. Point $R_i$ lies in a primary receiver array that runs along the line from $R_1$ to $R_2$. This primary receiver array comprises diffusely reflective points on the transreceiver wall 209.

After the returning light reflects off of the transreceiver wall 209, it passes through the camera lens 211 and is captured at receiver $C_i$ in the streak camera 214. Receiver $C_i$ lies in a secondary receiver array that runs along the line from $C_1$ to $C_2$. This secondary receiver array is in the streak camera 214.

In the example shown in FIG. 2, the occluder wall 207 prohibits both the laser 201 and the camera 203 from looking directly at the moving object O 205 beyond the occluder wall 207. However, it is possible to look at object O through an intermediate bounce at the transreceiver wall. This "transreceiver wall" is so named because it plays the role of secondary transmitter of light coming from laser to illuminate the object as well as the role of primary receiver of light coming back from the object letting camera work as a secondary receiver. The moving object O 205 is located in a visually cluttered environment. The environment may be cluttered, for example, with multiple other items, e.g., 213, 215, 217.

In exemplary implementations of this invention, multipath analysis is performed. Photons travel from the target object to the camera in different paths. Photons arrive at the camera at different times, depending on which of path is taken. In the multipath analysis, differential times of arrival can be exploited for locating the object.

Here is a description of how differential times of arrival may be used.

Since the time-of-flight camera (e.g., 214) has a very short integration time, the speed of object is extremely slow compared to image capture time. Thus, in some implementations, the real life moving object can be assumed to be stationary during this capture time.

For purposes of estimating an object's motion, only intra-frame differential times of arrival relative to the arrival time of the first photon are used.

Differential times of arrival can be exploited for locating a stationary object, such as object 205 (which is assumed in some implementations to be stationary during capture time). Consider a single frame capture by time-of-flight camera. The space-time response of object 205 is made up of photon arrival times for an array of secondary receivers along line $C_1$ to $C_2$. Each of these arrival times for a particular receiver $C_i$ is determined by the path a ray took from laser to $C_i$.

Consider the two different paths from laser to $C_0$ and $C_i$ through a given secondary transmitter Tx that also go through primary receivers $R_0$ and $R_i$ respectively. Both $R_0$ and $R_i$ lie on the primary receiver array on the transreceiver wall 209.

Assume that $Path_0$ is the shortest distance path among all possible discretized paths, thus it corresponds to time of arrival (at the streak camera 214) of the first photon from object 205. $Path_i$ represents any other possible non-shortest distance path.

Multi-path representations of both these paths can be described as follows:

$$Path_0 = LT + TO + OR_0 + R_0C_0$$

$$Path_i = LT + TO + OR_i + R_iC_i$$

where T is the transreceiver wall 209 and O is the object 205.

The relative times of arrival for any non-shortest distance path with respect to shortest time of arrival, can be written as:

$$\Delta Path_i = Path_i - Path_0$$

$$\Delta Path_i = [OR_i + R_iC_i] - [OR_0 + R_0Q_0]$$

The differential times of arrival are dependent on two path disparities: (1) difference between paths from object O 205 to primary receivers $R_0$ and $R_i$; and (2) difference between paths from $R_0$ and $R_i$ to $C_0$ and $C_i$ respectively.

Out of these path disparities, the latter (due to RC pairs) are within line of sight, so they can be calculated earlier using the time of flight camera. Hence these time differences are subtracted, resulting in processed differential time of arrival:

$$\delta Path_i = OR_i - OR_0$$

From the third bounce capture time-of-flight camera output, $\Delta Path_i$ is calculated and then processed to obtain $\delta Path_i$.

The above discussion explains how, in multipath analysis, differential times of arrival may be used.

In exemplary implementations of this invention, the motion of a hidden object may be estimated as follows:

Assume the object 205 moves along a line in x-y plane from position P to Q. The streak camera 214 captures two space-time images [I(x,t)], $Frame_i$ and $Frame_{i+1}$, one when object O is at location P and the other one when the object is at location Q. The location of the object in each of these instances (position P and position Q) can be estimated. Thus, the motion vector PQ can also be estimated.

A motion estimation algorithm may comprise the following four steps.

First step (of motion estimation algorithm): subtract $Frame_{i+1}$ from $Frame_i$.

$$S = Frame_{i+1} - Frame_i$$

This gives the space-time impulse responses of moving object O exclusively, as the static cluttered environment responses get canceled out. With this subtracted image, we have the response of the object in position P with positive values and response of the object in Q with negative values, provided that the two responses do not overlap. The individual responses are segmented out, by treating each signed value response set as an individual response from each location.

Consider only pixel values which are smaller than $\epsilon$ in $Frame_{i+1}$ and $Frame_i$.

$$response_P = S.*(S>0).*(Frame_{i+1} \leq \epsilon)$$

$$response_Q = -S.*(S<0).*(Frame_i \leq \epsilon)$$

Figure 3A:
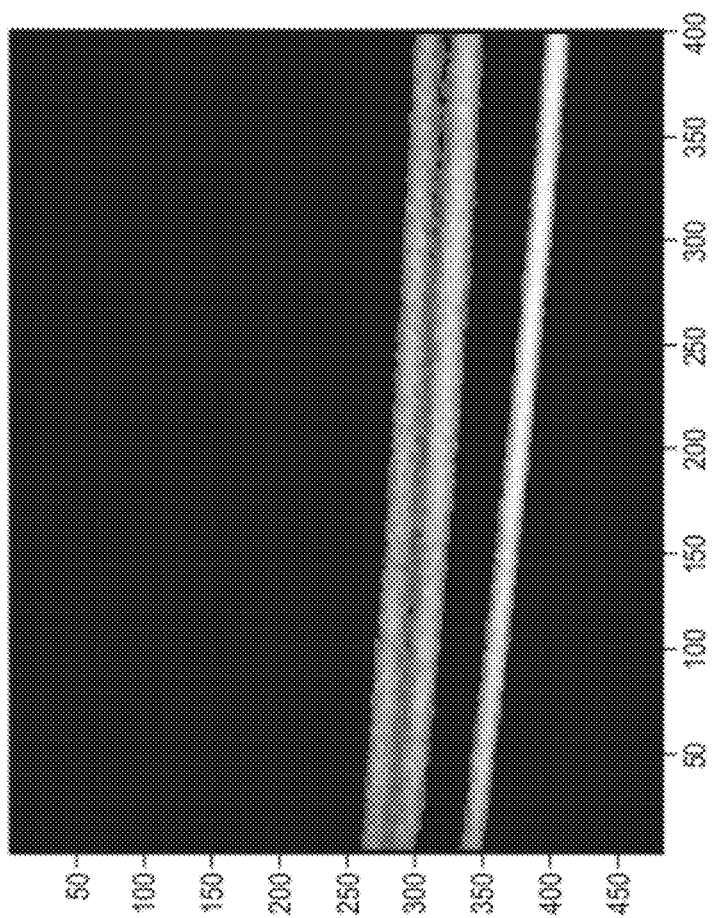
Figure 3C:
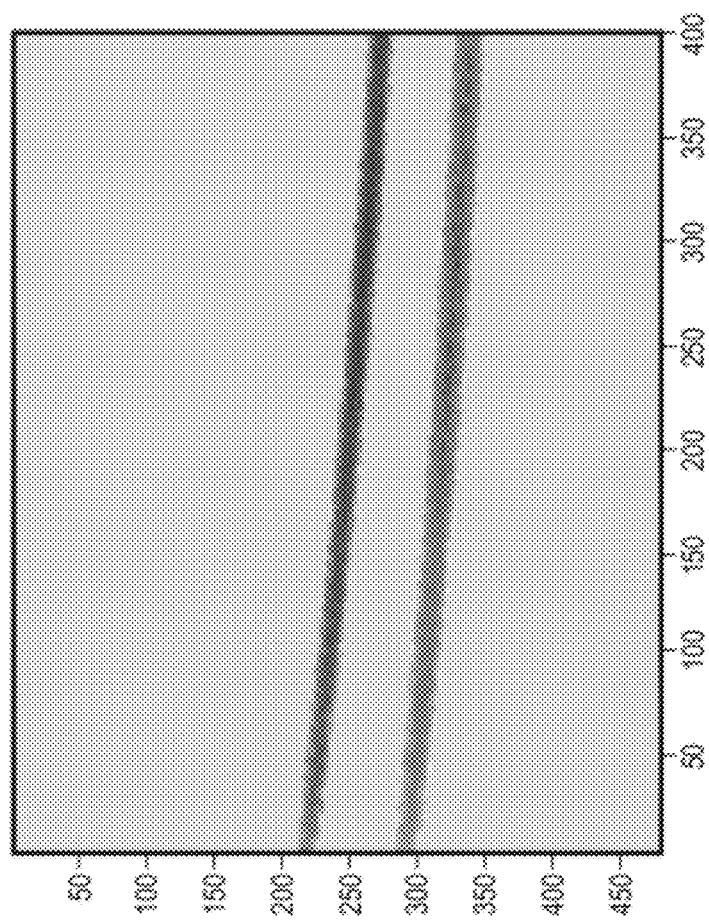
Figure 3D:
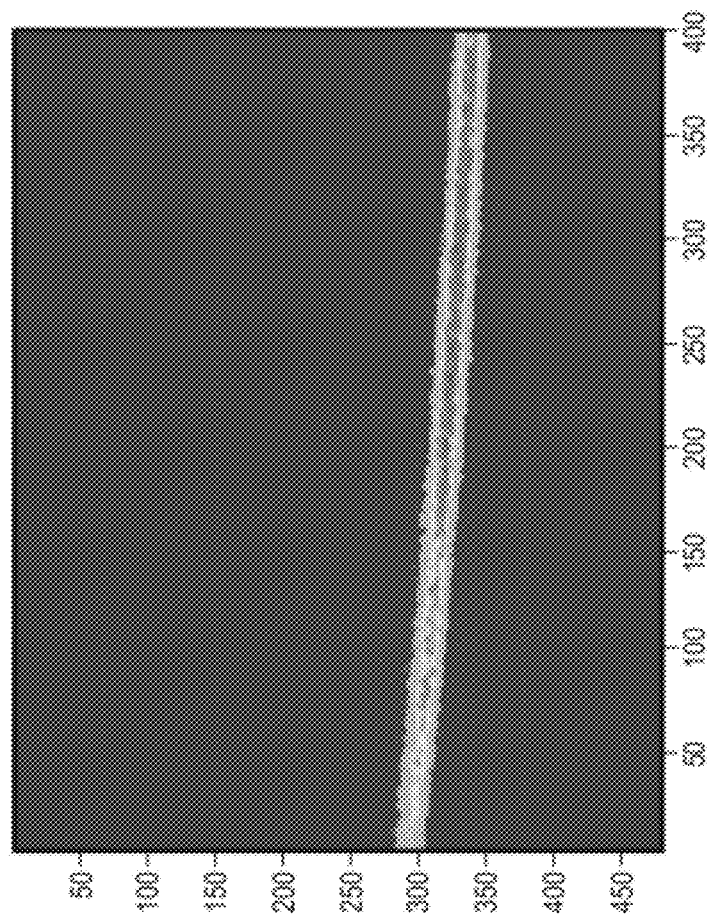
Figure 3E:
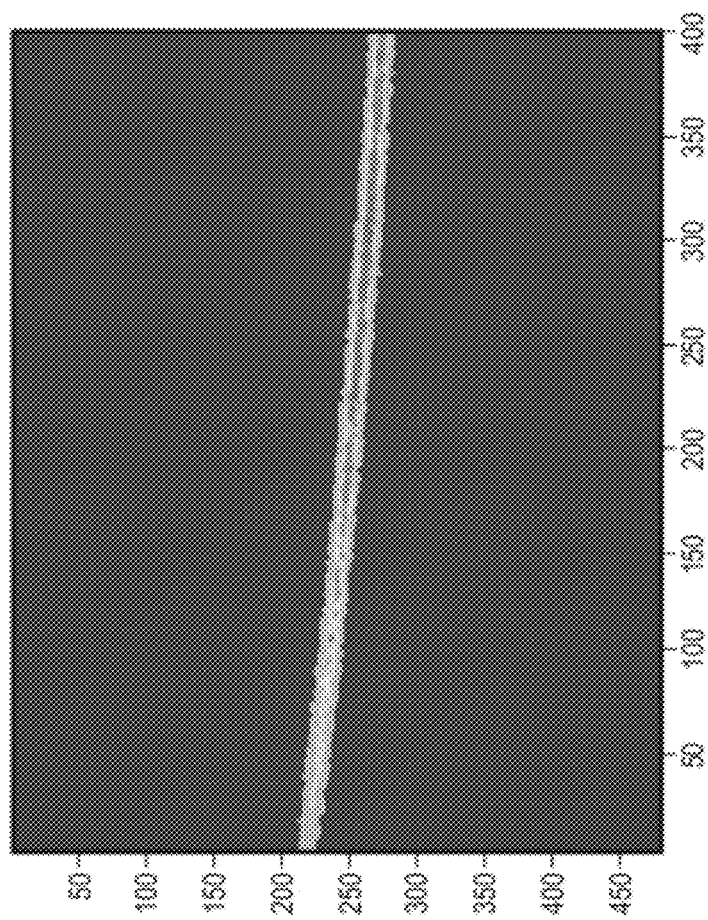

An example of this first step (of the motion estimation algorithm) is shown in FIGS. 3A to 3E. In these Figures, the response from location P and response from location Q are extracted from the two frames by taking a difference of two frames, and then taking the positive and negative values as the two separated streaks, respectively. FIG. 3A shows Frame 1. FIG. 3B shows Frame 2. FIG. 3C shows the difference between Frame 1 and Frame 2. FIG. 3D shows the response from Position P. FIG. 3E shows the response from Position Q.

The approach of positive and negative extracts after subtractions to get separated streaks works only when the displacements are larger than the actual size of the object. This approach fails to give results directly when the streaks being subtracted overlap. However this problem can be solved by observing multiple frames and subtracting non-overlapping frames and then interpolating the track for intermediate positions.

Second step (of motion estimation algorithm): Having extracted individual space-time response profiles corresponding to first and second location of moving object, find each of these locations by making use of the extracted responses.

For a given space-time response:

(a) Since the time values have an unknown bias due to unsynchronized laser and camera operation, set the time origin at time-of-arrival of first photon from moving object in the response profile. Thus, every other time of arrival is with respect to time-of-arrival of first photon returning from moving object. From this changed time origin response profile, pick only the first onsets arriving at each receiver, leading to a thin lined response curve. This is equivalent to treating the object as single point object for motion estimation purposes. (In contrast, for purposes of size estimation, the object is not treated as a single point source, and onsets other than the first onsets are considered.)

Figure 4C:
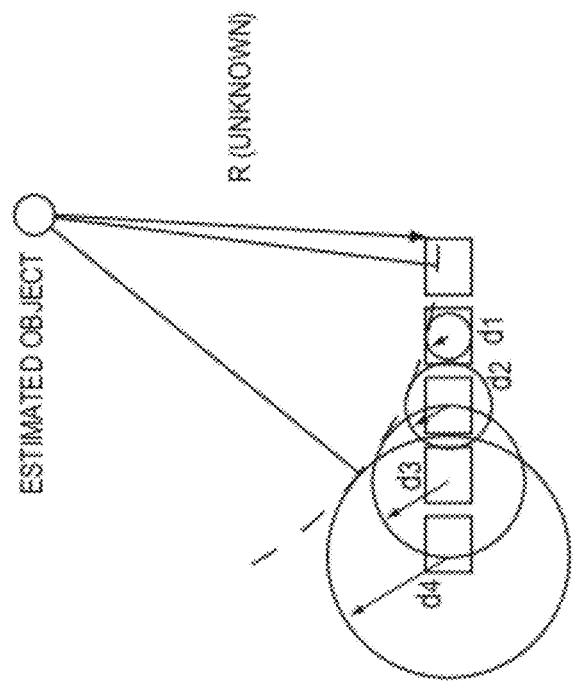
FIGS. 4A, 4B, and 4C illustrate how a motion estimation algorithm can use differential times-of-arrival by treating the transreceiver wall as a phased array.

(b) Backproject the wave fronts using these differential time-of-arrival by drawing locus circles around each primary receiver $R_i$ as shown in FIG. 4C. Each of these $i^{th}$ circle essentially gives locus of the possible points where the photon that later arrived at $R_i$ could have been when first photon reached $R_0$.

(c) As all photons on these newly backprojected locus circles originated from object O, they have to be equidistant from a particular point, and that equal distance in theory equals $OR_0$ (which we do not know in practice).

Third step (of motion estimation algorithm): Take the front side convex hull of all these backprojected locus circles and solve a constrained least squares problem for a point that gives least distance variation from all these points results in solution of the absolute location of object.

$$\min \frac{1}{2} \| Mx - D \|_2^2,$$

such that lb<x<ub
where lb and ub define lower and upper bounds on locations within the occluded region and $$x = [location_x; location_y] \text{ and } M(i,:) = [m_i, 1]$$

and $m_i$ is the slope of normal to the convex hull curve at $i^{th}$ point on the curve.

$$D(i) = y_i + m_i x_i$$

where $y_i$ and $x_i$ are coordinates of $i^{th}$ point on the curve.

[$location_x$, $location_y$] = estimated target location

Fourth step (of motion estimation algorithm): Compute motion vector PQ (using the estimated locations P and Q) of the moving object. Also, estimate the velocity from the relation $$v = \frac{|PQ|}{T} * \frac{PQ}{|PQ|} \text{ where } \frac{PQ}{|PQ|}$$

is the unit vector along motion direction.

Figure 4B:
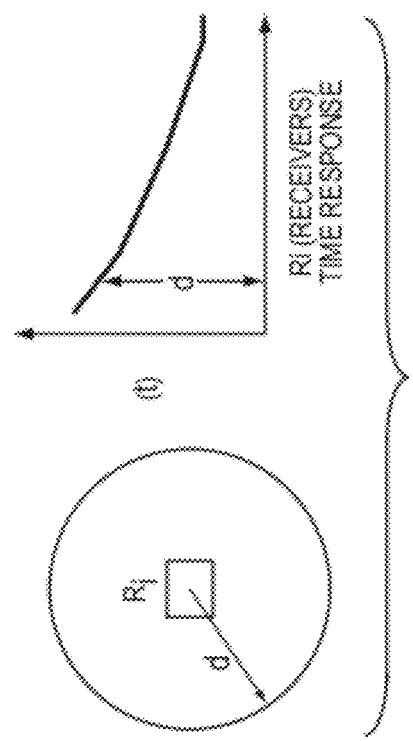
Figure 4A:
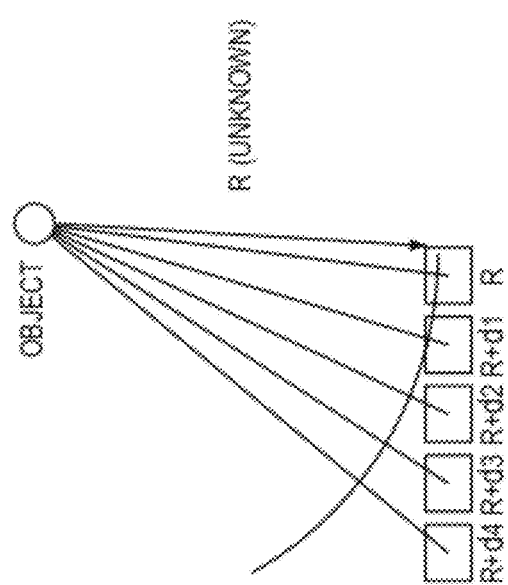

FIGS. 4A, 4B, and 4C illustrate how a motion estimation algorithm can use differential times-of-arrival by treating the transreceiver wall as a phased array. FIG. 4A shows a forward model for phased array based capture. FIG. 4B shows the locus of differential time-of-arrival wavefront. FIG. 4C shows estimated object localization using constrained least squares.

Advantageously, the constrained least square model in spatial domain is easy to use However, other techniques can be also applied from the area of source localization in communication theory and acoustics, such as Generalized Cross-Correlation PHAse Transform (GCPHAT) and Adaptive Eigenvalue Decomposition (AED).

Note that the model explained above is a point object model. Almost every real life object is a non-point object. Thus this approach will give the tentative centers of locations of the objects but will not be able to track object as a point cloud. However, the approach can be revised to solve for a point cloud, as follows:

The solution for a point cloud of objects can be obtained by setting the distance locus error below an adaptive threshold.

Thus, if $f(g_i)$ ($g_i$ being parameterized version of closed solution) is the function that defines the closed point cloud of solution for the object existence, where $f(g_i)$ is the frontal contour boundary in the flatland of the scene; and if b is the streak image data vectorized, the closed form solution becomes:

$$\text{maximize}(g1, g2, g3 \ldots gN) \text{ subject to } \|A*f(g_i) - b\|_2 < \epsilon$$

where $\epsilon$ is the error threshold adaptively set to the error level that covers a point cloud. For example, this error can be the error for the solution of the point-object problem.

If the parametric function is assumed to be an ellipse with the ellipse origin, tilt angle and the major and minor axes, ($x_0$, $y_0$, $\theta$, a, b), then elliptical contour solutions can be obtained with the extreme curves.

Extreme curves define the left right and front back extreme constraints for the boundary contour of the object existence.

The extreme curves in such a case can be selected as: (a) lowermost curve: front extrema; (b) uppermost curve: back extrema; (c) left top to right bottom curve: right extrema; (d) left bottom to right top curve: left extrema.

Figure 6:
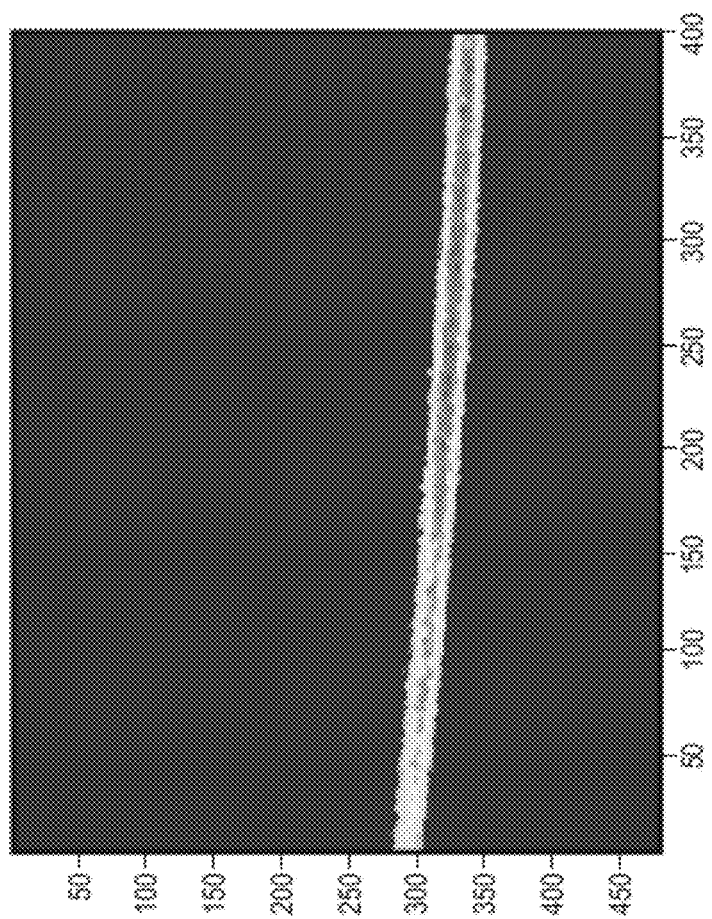
Figure 7:
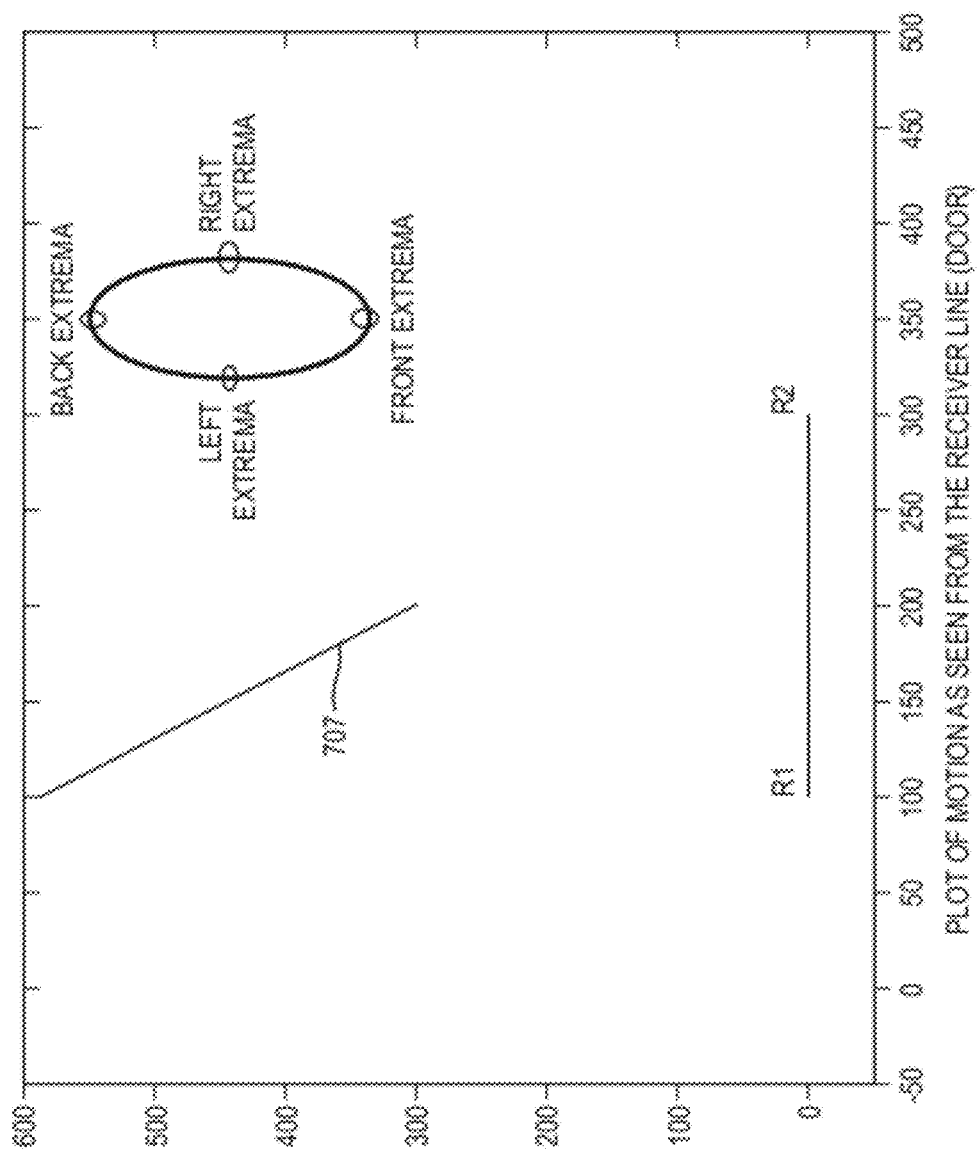
Figure 8:
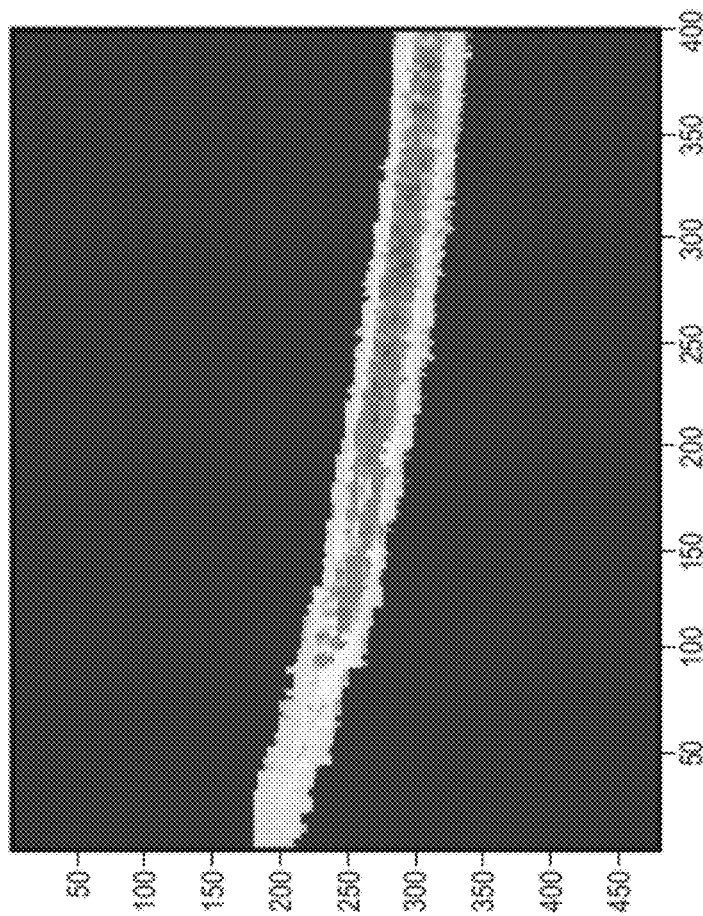
Figure 9:
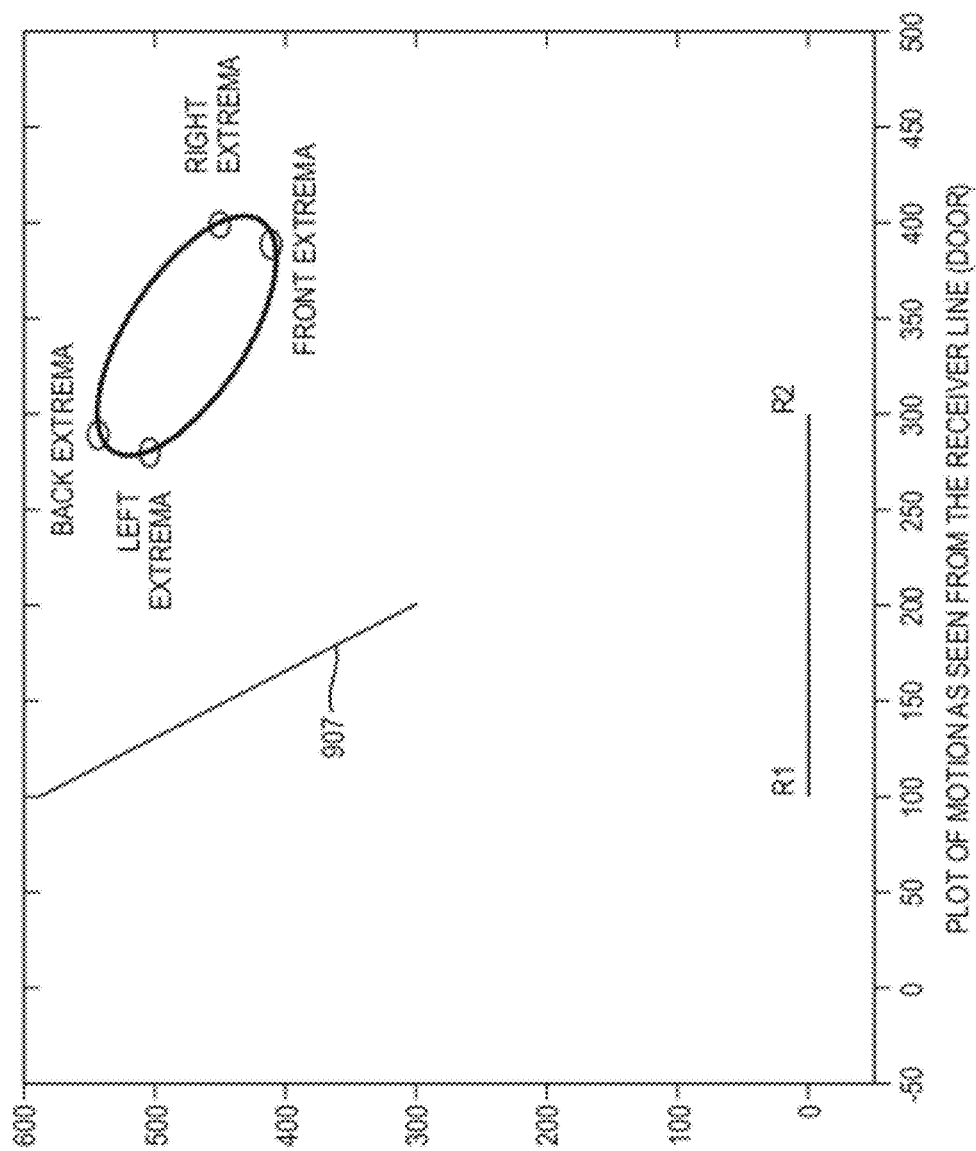
Figure 10:
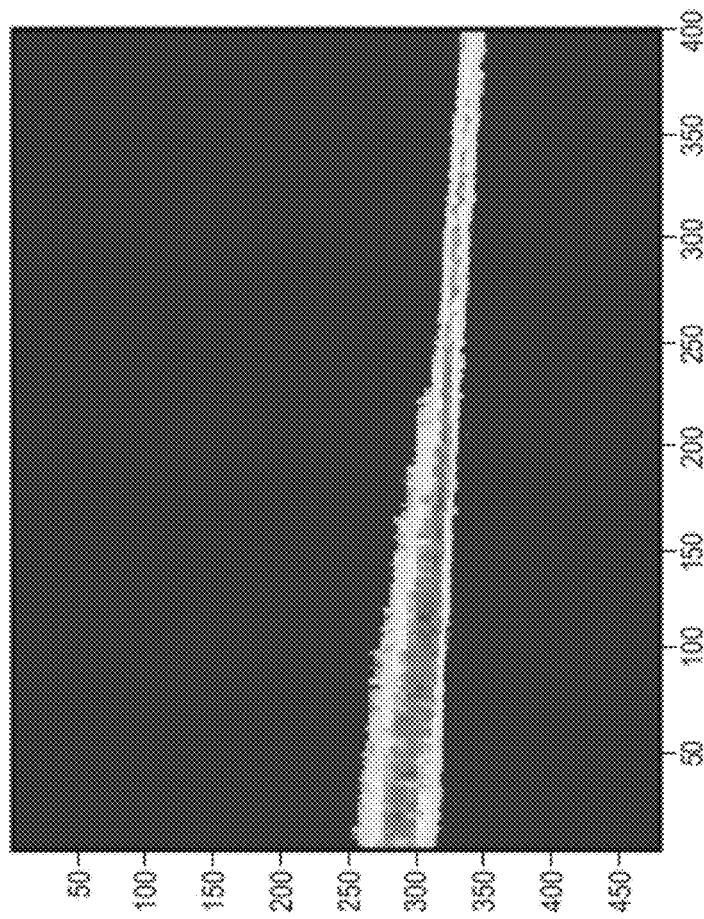

FIGS. 5, 7, and 9 show different extrema configurations, that correspond to the different streak patterns in FIGS. 6, 8 and 10. These streak patterns were captured by a streak camera in a prototype of this invention.

If the streaks arriving from left right front and back extremas are normal, then a normal thin ellipse can be expected, as shown in FIG. 5. FIG. 6 shows a streak image that corresponds to the ellipse shown in FIG. 5.

If the streaks arriving from left right extremas are normal but have a strong difference in the front and back layer extremas (a consistently thick banana), then a vertically elongated ellipse can be expected, as shown in FIG. 7. FIG. 8 shows a streak image that corresponds to the ellipse shown in FIG. 7.

If the streaks arriving from left right extremas are asymmetric such that the left side of streaks much thicker than the right side with a strong difference in the front and back layer extremas (a thick banana), then an ellipse tilted towards in a clockwise manner can be expected, as shown in FIG. 9. FIG. 10 shows a streak image that corresponds to the ellipse shown in FIG. 9.

(FIGS. 5, 7, 9, 13, 15, 16, 17 are charts that show flatland positions, in illustrative tests of a prototype of this invention. In these charts, the x-axis and y-axis correspond, respectively, to x and y coordinates in flatland. On each axis, 100 units equals 7 cm. In FIGS. 5, 7, 9, 13, 15, 16, 17, respectively, an occluding wall 507, 707, 907, 1307, 1507, 1607, 1707 is shown.)

The immediately preceding discussion explains how location and motion may be estimated.

Figure 11:
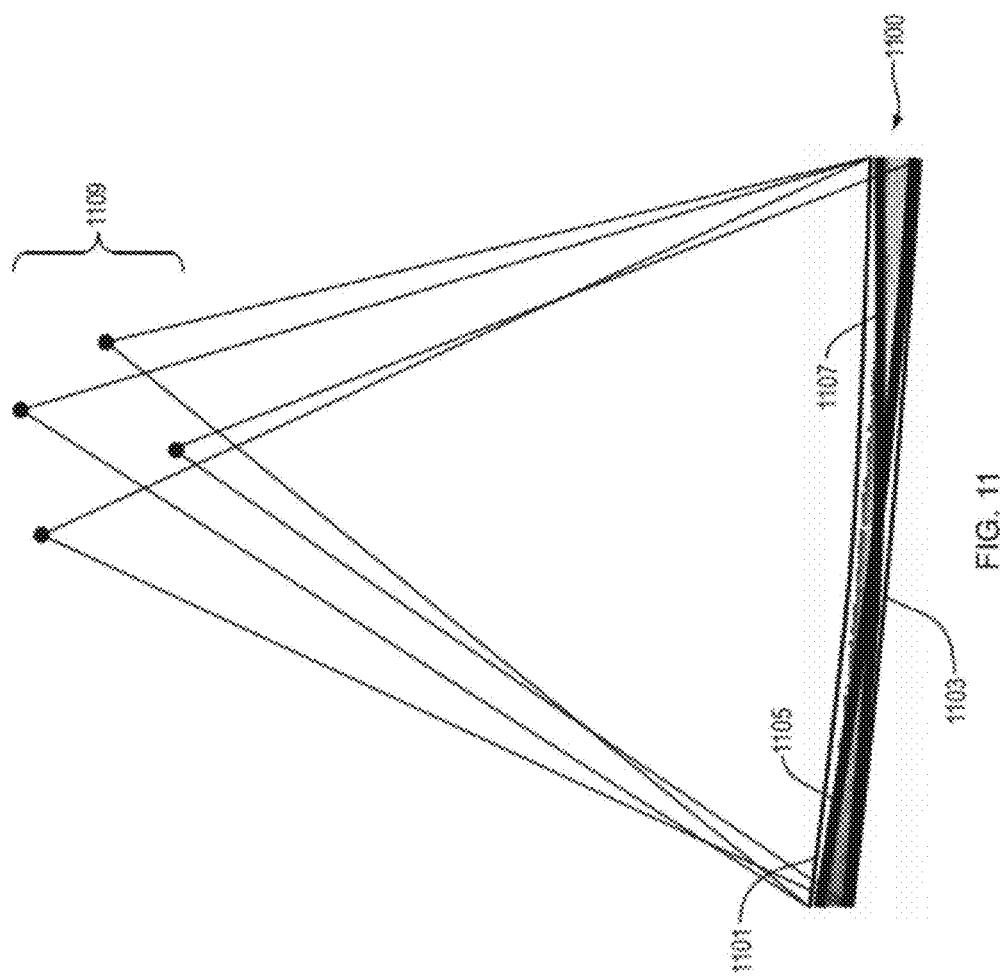
FIG. 11 illustrates how the size of an object can be estimated.

In exemplary implementations of this invention, the size of a moving object may also be estimated as follows:

As shown in FIGS. 3D and 3E, actual extracted space-time responses have a finite width for each receiver resulting in a thick banana shaped profile instead of a thin lined profile curve. Consider these complete thick profiles. The thicker profile appearance results from the fact that these photons don't just arrive from the closest point on object (first onset) but also from all other points that the object is made up of. Thus, two extreme profile curves can be extracted that lead to backprojection of two ends of the object (as seen from the transreceiver wall) as shown in FIG. 11. This is tantamount to finding the diameter of circle of confusion created if we were to solve the least squares problem for all possible choices of profile curves from the banana shaped profile.

Like in the multi point object tracking, if the parametric function of object contour is assumed to be an ellipse with the ellipse origin, tilt angle and the major and minor axes, ($x_0$, $y_0$, $\theta$, a, b), elliptical contour solutions can be obtained with the extreme curves.

Multi point object tracking and object sizing are both effectively achieving the same thing, which is getting the constraint on the object existence contour.

Extreme curves define the left right and front back extreme constraints for the boundary contour of the object existence.

The extreme curves in such a case can be selected as: (a) lowermost curve: front extrema; (b) uppermost curve: back extrema; (c) left top to right bottom curve: right extrema; and (c) left bottom to right top curve: left extrema.

In exemplary implementations, an object existence constraint contour as seen from the transreceiver wall or the secondary surface is estimated.

FIG. 11 illustrates how the size of an object can be estimated. As shown in FIG. 11, a recorded banana shaped streak profile 1100 comprises a back extremum arc 1101, front extremum arc 1103, left extremum arc 1107, and right extremum arc 1105. The size of a moving object (as seen from the primary receivers) is estimated by backprojecting the extremas of time responses received. The locus of back-projections of all possible arcs gives a point cloud 1109 of the estimated size. In the example shown in FIG. 11, the primary receivers comprise diffusely reflective points on the transreceiver wall.

Although the technique can estimate only front layer width, this information in itself is very useful. In most cases over a period of time one can take front side width measurements and gauge the real size range of the object. This approach fails only in rare cases when the target object is moving in only one orientation all the time, and has strongly disproportionate length in the back layer.

In exemplary implementations of this invention, an ultra short pulse laser is employed. For example, a femto second laser (which can emit short light pulses of durations below 1 ps) may be used. Such a short pulse can be achieved by a phenomenon called passive mode locking.

Here is a description of a prototype of this invention:

In this prototype, a femto second laser emits 80 fs pulse duration, 790 nm wavelength, 800 mW average output power pulses. A pico second accurate streak camera is used. The camera comprises a Hamamatsu® C5680 series streak camera that allows space time information capture by photon time of arrival and line of arrival. The light pulse as a response of the scene enters the camera, and then gets focused onto the photo cathode tube of the camera with the help of a lens. The streak tube converts the information inherent in the arriving photons into electrons and these electrons are then accelerated and conducted through the tube which registers the time offsets as well as variation in energy (intensity). The electrons are deflected in different angles at different speeds finally touching the Micro Channel plate (MCP). When electrons arrive at the MCP, they are multiplied by hundreds of times and are then projected towards the phosphor screen, which again converts them back to light. The fluorescence image corresponding to the time of arrival of these photons is then created at the screen. The vertical axis of the camera serves as a temporal axis.

In a prototype of this invention, the camera is operated in a streak mode with the selection of: C5680 main unit, selection of the input optics, selection of streak tube and the output format. The display ends shows streak images with one axis being a one dimensional space and other dimension being time in picoseconds. The MCP gain for the camera was found to be non-linear and thus was characterized and normalized by the modeling performed.

In a prototype of this invention, a time-of-flight camera comprises a femto second laser and a streak camera. In particular, a Ti:Sapphire laser is used to illuminate a spot on the transreceiver wall with 80 fs, 790 nm wavelength, 800 mW Average output power pulses and a Hamamatsu® C5680 universal streak camera that can resolve up to 10 ps level time differences of arrival. The time resolved photon arrival profile over a 15 cm long one dimensional space is captured, giving a 2D space vs time image for a nanosecond wide period as one capture frame. This one dimensional space observed is a line of array of primary receivers that can see moving objects. The 2D images captured comprise space-time impulse responses (I(x,t)) of the scene.

In tests of this prototype, a cluttered environment of miscellaneous objects set up in the region behind the occluding wall. Objects coated with diffuse lambertian reflecting paint are moved along a line in x-y plane and one nanosecond-long space-time images of scene at time instants separated by T=1 sec are taken. Each of these space-time images has a resolution of 10 ps on time axis and 0.2 mm on spatial (receiver array) axis. Two successive space-time images may be called Frame$_i$ and Frame$_{i+1}$.

Since the exposure time of time-of-flight camera is much shorter than actual travel time for path from laser to camera, there has to be a time shift between laser and camera trigger. Any absolute time shifts are impossible to calibrate because small mechanical shift in devices can create multiple pico second of errors. So uncalibrated global time shift (unknown temporal relationship) based recovery is used. This time shift is assumed to be constant across a set of measurements if the measurements are taken within a few seconds of each other. However the value of this global time shift in not known. Thus absolute times of arrival are unavailable. However, in some cases, only differential times of arrival (relative to arrival time of the first photon from the moving target) are used.

Figure 12:
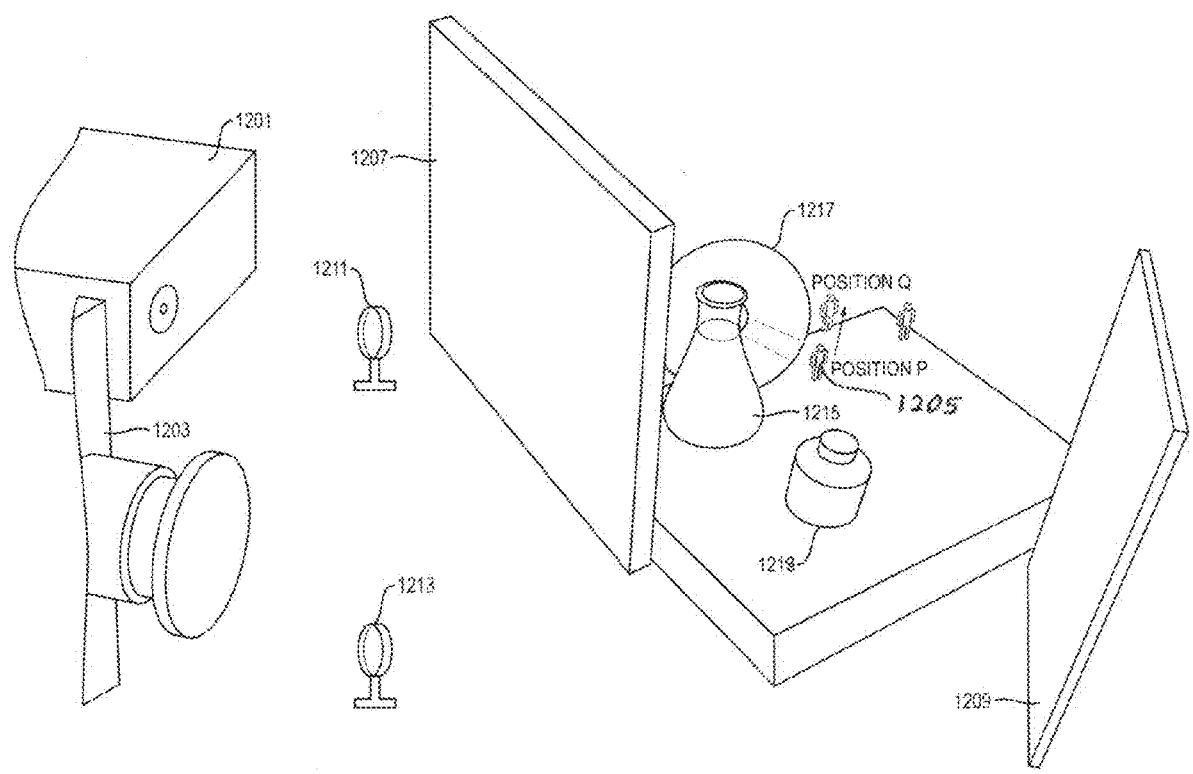
FIG. 12 shows an object (i.e., a human-shaped figure) moving from position P to Q as a linear motion in flatland.

FIG. 12 shows an object (i.e., a human-shaped FIG. 1205 moving from position P to Q as a linear motion in flatland. The moving object 1205 is hidden (from a laser 1201 and a streak camera 1203) by an occluding wall 1207 and is located in a visually cluttered environment. The cluttered environment comprises a compact disk 1217 (diffractive reflection), metallic cylinder 1218 (specular reflection) and transparent water container 1215 (refraction). Light from the laser 1201 is steered by steering mirrors 1211, 1213 to a diffusely reflective transreceiving wall 1209. It then travels to the moving object 1205, then back to the transreceiver wall 1209, then to the streak camera 1203.

Figure 13:
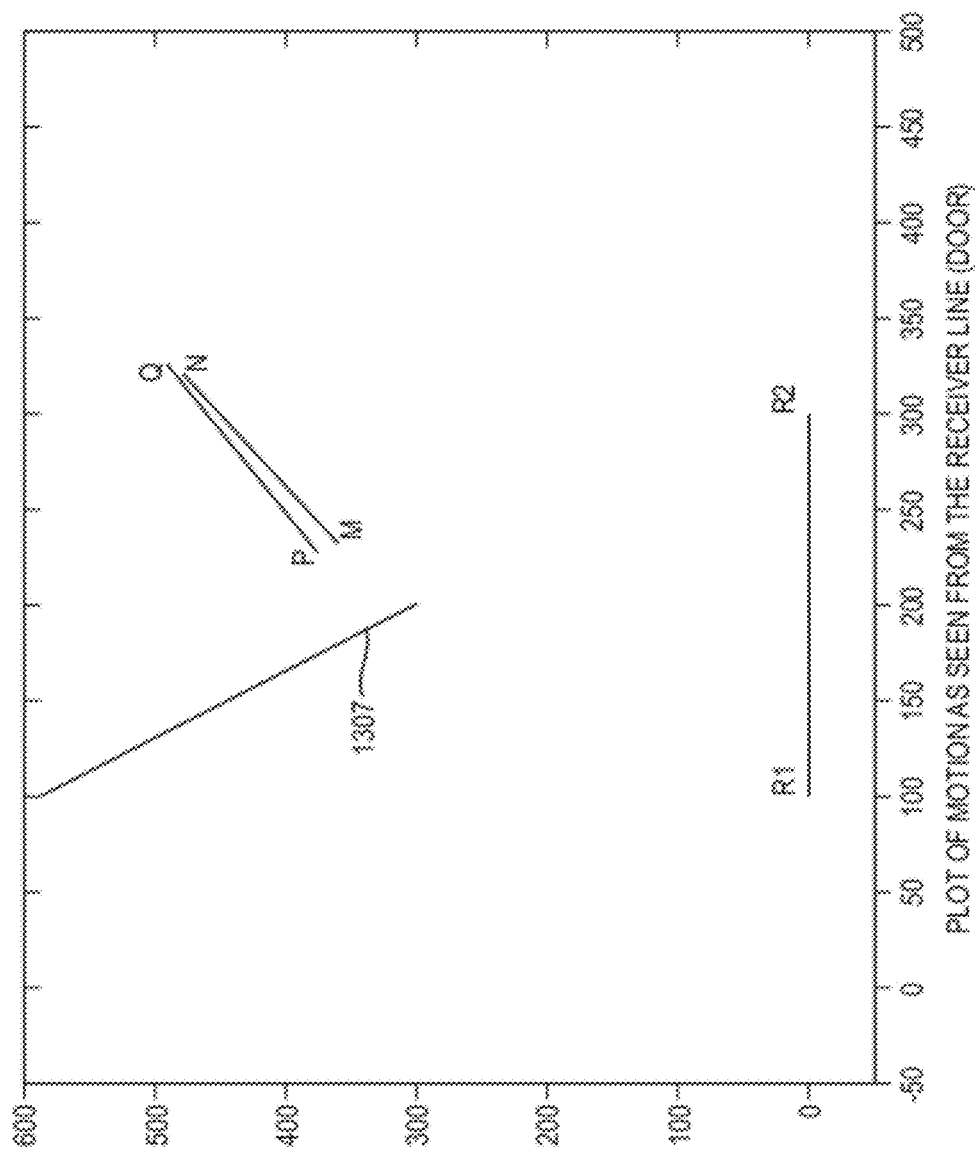
FIG. 13 shows motion estimation results (P, Q) for a moving object (a human-shaped figure) in cluttered surroundings, compared with the ground truth (M, N).

FIG. 13 shows motion estimation results (P, Q) for a moving object (a human-shaped figure) in cluttered surroundings, compared with the ground truth (M, N).

Figure 14:
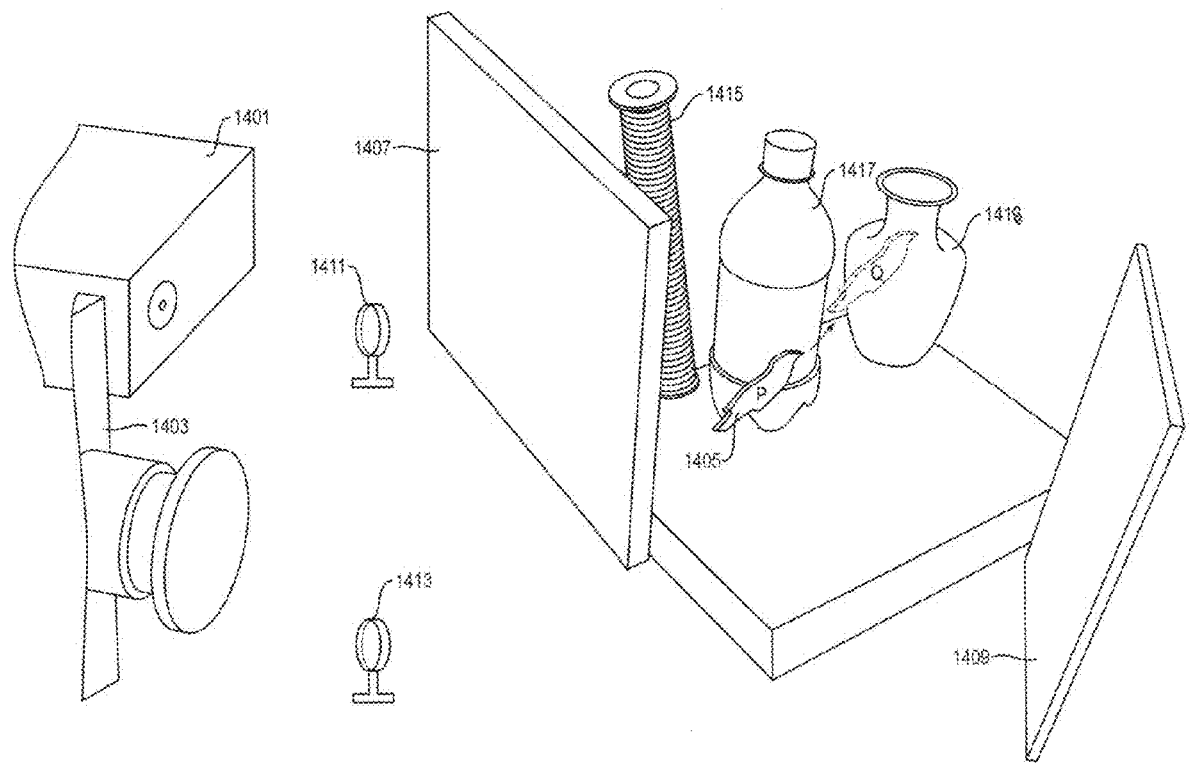
FIG. 14 shows an object (i.e., a bird-shaped figure) moving from position P to Q as a linear motion in flatland.

FIG. 14 shows an object (i.e., a bird-shaped FIG. 1405 moving from position P to Q as a linear motion in flatland. The moving object 1405 is hidden (from a laser 1401 and a streak camera 1403) by an occluding wall 1407 and is located in a visually cluttered environment. This cluttered environment includes a lens 1415 (refraction), metal flowerpot 1418 (specular reflection) and water bottle 1417 (refraction). Light from the laser 1401 is steered by steering mirrors 1411, 1413 to a diffusely reflective transreceiver wall 1409. It then travels to the moving object 1405, then back to the transreceiving wall 1409, then to the streak camera 1403.

Figure 15:
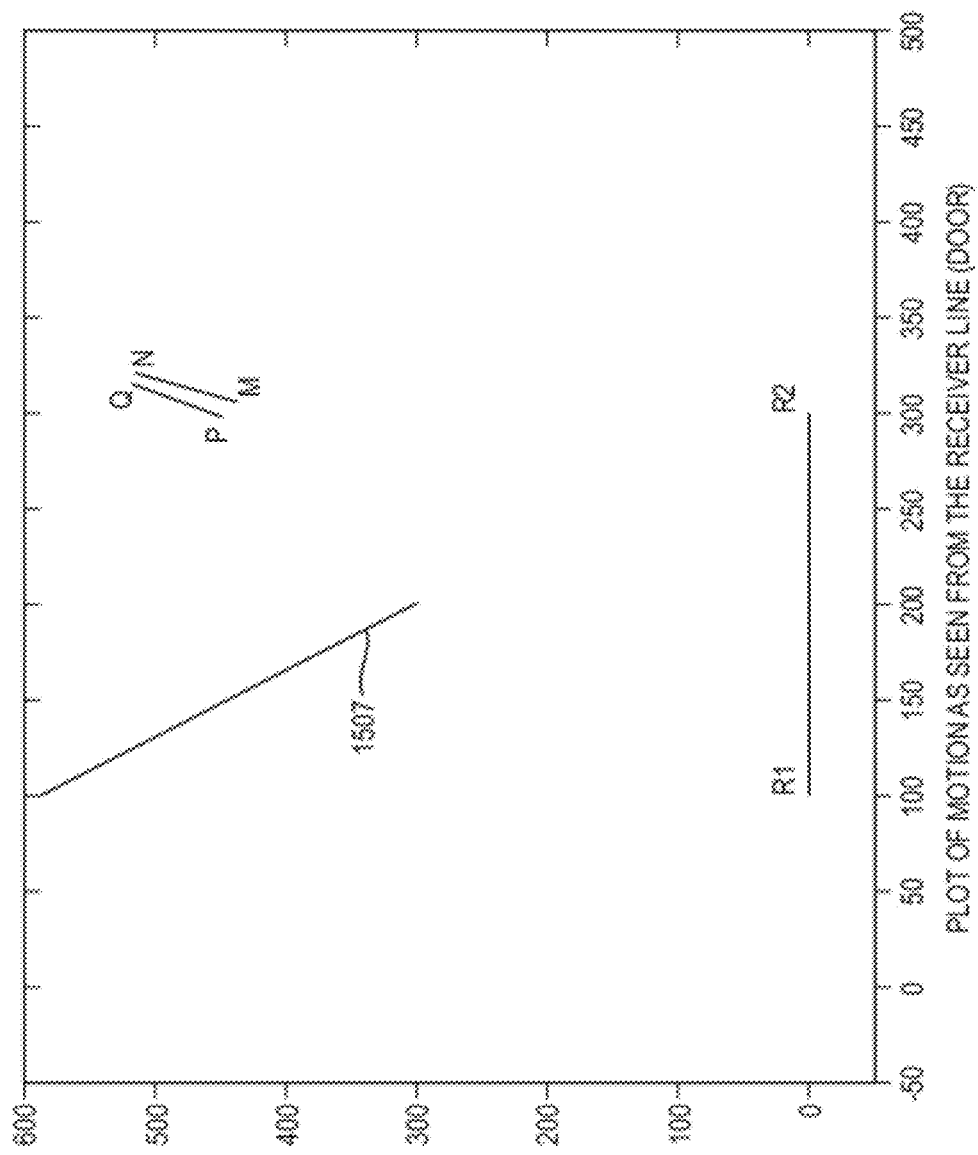
FIG. 15 shows motion estimation results (P, Q) for a moving object (a bird-shaped figure) in cluttered surroundings, compared with the ground truth (M, N).

FIG. 15 shows motion estimation results (P, Q) for a moving object (a bird-shaped figure) in cluttered surroundings, compared with the ground truth (M, N).

Successive dual frame tracking is not preferred. This is because, in cases when the target moving object displacements are smaller than the object size, the estimates do not exactly correspond to the free space object points as the streaks from location P and location Q cannot be disambiguated in such cases.

However, with a multi frame longer duration of observation this problem can be solved, as the interpolation can lead to intermediate positions. Here the fast nature of signal capture in streak cameras can be used to advantage, because the motion can still be treated as linear over the longer period of observation.

Figure 16:
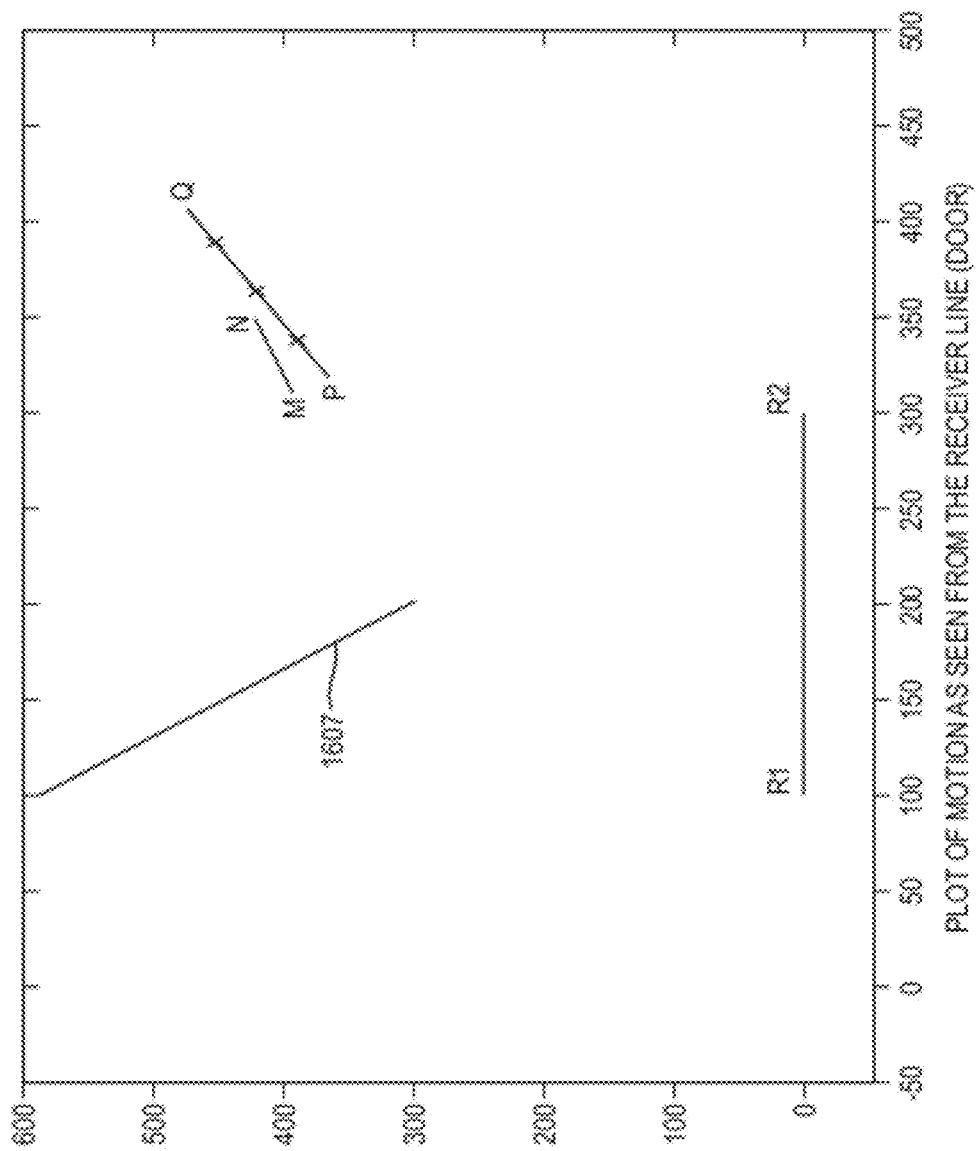
FIG. 16 is a chart that shows motion estimation results (P, Q) for a moving object (bird-shaped figure) in cluttered surroundings, compared with the ground truth (M, N).

FIG. 16 is a chart that depicts results of multi-frame observation, in a prototype of this invention. This chart shows motion estimation results (P, Q) for a moving object (bird-shaped figure) in cluttered surroundings, compared with the ground truth (M, N). This chart shows that multi frame tracking with interpolation works even in a context where the displacement of an object between successive frames is smaller than the object size (In contrast, dual-frame successive tracking would fail in that context.) Observing the object for a longer time enables larger displacements to be captured and interpolating within them gives intermediate positions under the assumption that motion is linear within the few nanoseconds of observation. For example, in FIG. 16, using ith and (i+4)th frame can give the three intermediate positions. Advantageously, the (i+4)th frame and ith frame do not have an overlap in object positions even if the object size is slightly larger.

Figure 17:
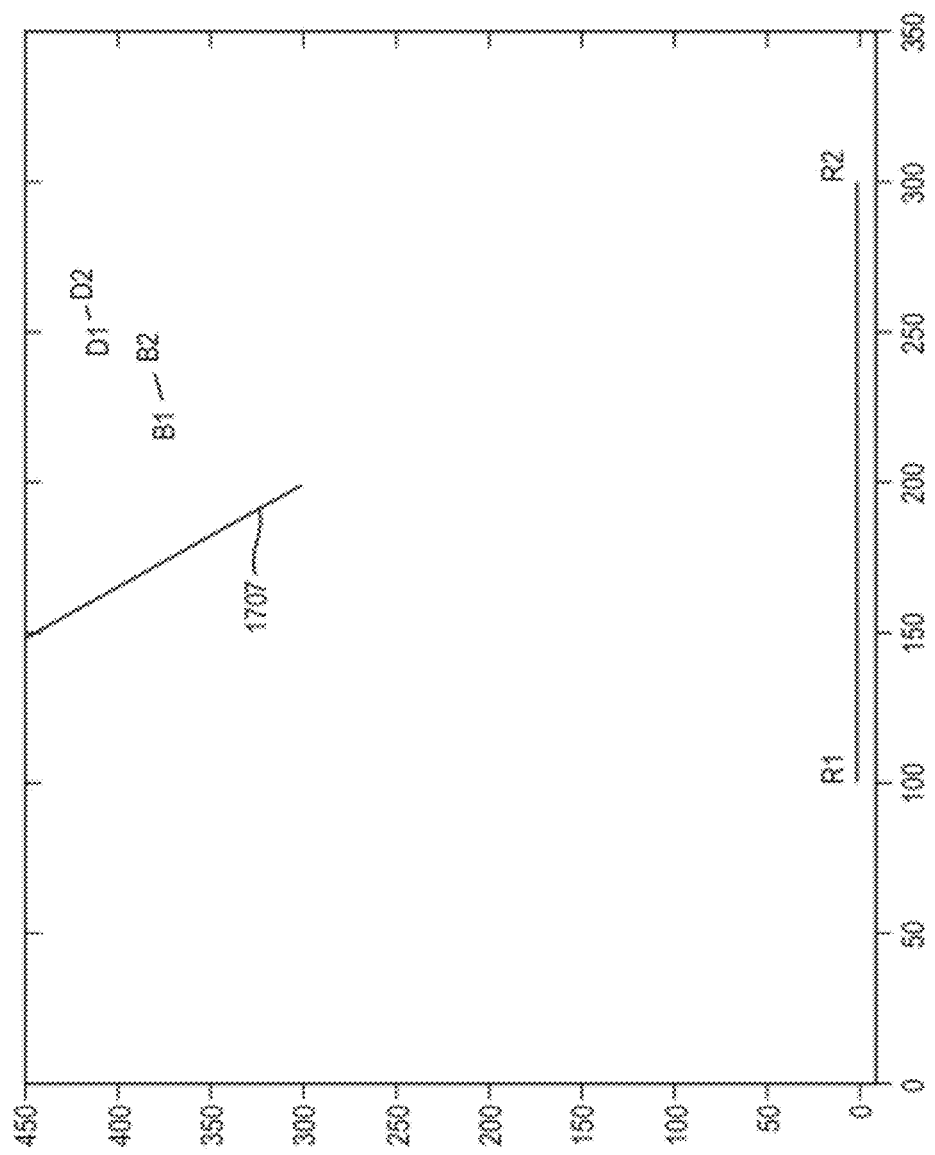
FIG. 17 is a chart that shows size estimation results $B_1B_2$, $D_1D_2$ for two moving objects (a bird-shaped figure and a human-shaped figure). Sizes in the chart indicate the upper bounds on the size as seen from the transreceiver wall.

FIG. 17 is a chart that shows size estimation results $B_1B_2$, $D_1D_2$ for two moving objects (a bird-shaped figure and a human-shaped figure). Sizes in the chart indicate the upper bounds on the size as seen from the transreceiver wall.

Figure 18:
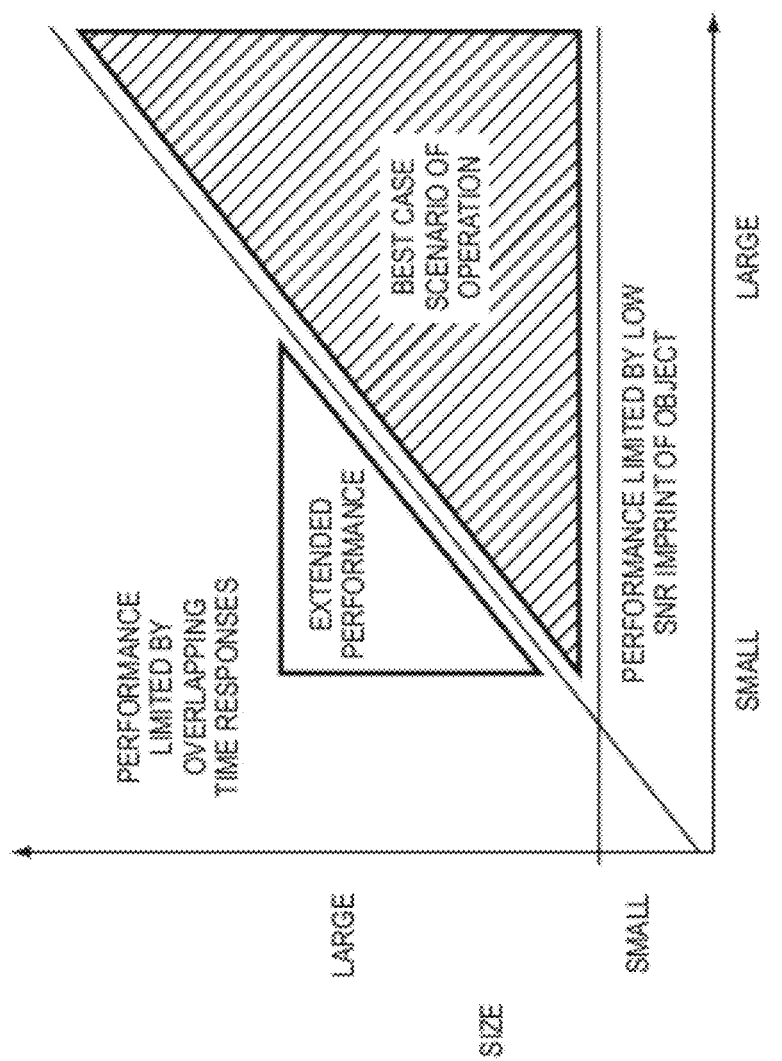
FIG. 18 is a chart that shows a matrix of factors that can boost or deter performance of this invention.

FIG. 18 is a chart that shows a matrix of factors that can boost or deter performance of this invention. In FIG. 18, the y-axis and x-axis in the chart are for the size and displacement, respectively, of a moving target in FIG. 18. In FIG. 18, the region of "extended performance" is a region in which extended performance may be achieved by multi-frame tracking and interpolation.

Figure 19:
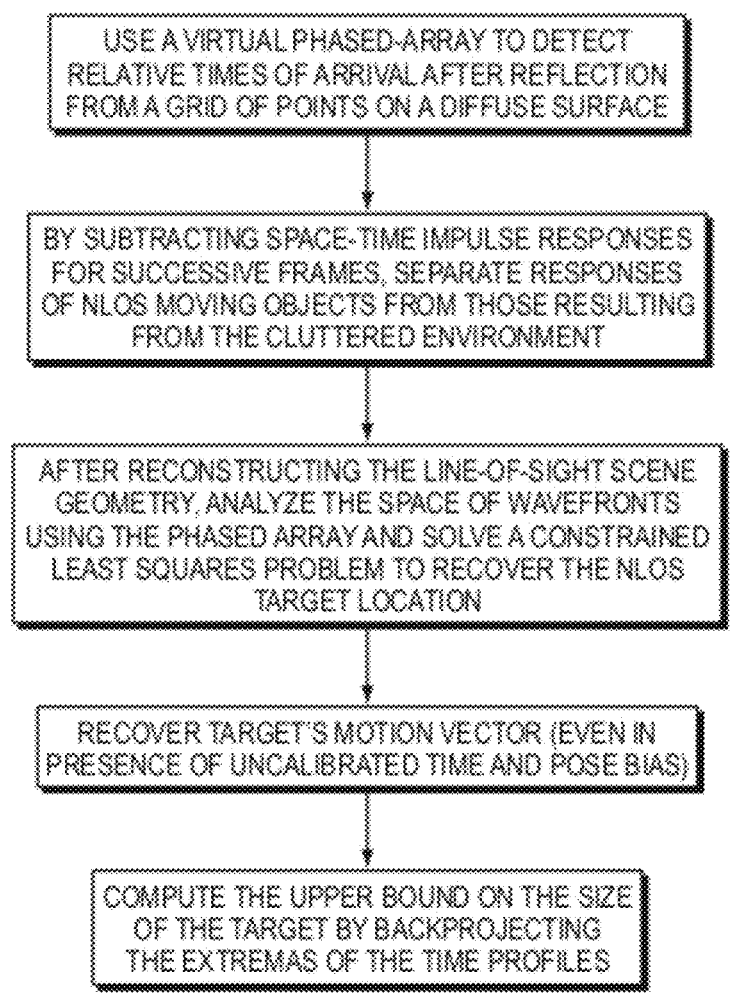
FIG. 19 is a flow chart of steps that can be used to determine a moving target's motion and size.

FIG. 19 is a flow chart of steps that can be used to determine a moving target's motion and size.

FIG. 20 is a high level diagram of some hardware elements. A time of flight camera 2001 comprises a laser 2002 and a streak camera 2004. The laser 2002 provides illumination 2003. The streak camera 2004 captures the scene response. One or more computer processors 2005 perform computations. Depending on the particular implementation, the number and location of processors may vary. For example, one or more of the processors may be located remotely from the remainder of the processors or from the time-of-flight camera.

Definitions and Clarifications:

Here are a few definitions and clarifications. As used herein:

The terms "a" and "an", when modifying a noun, do not imply that only one of the noun exists.

The term "for example" means as a non-limiting example.

The term "include" shall be construed broadly, as if followed by "without limitation".

The terms "light" is not limited to visible light, but includes electromagnetic radiation of any frequency. Similar terms, such as "illumination", "illuminate" and "shine", shall be construed broadly in the same manner. For example, an "illumination source" is a source of electromagnetic radiation.

An object is "non line of sight" or "NLOS" with respect to a camera if the object cannot be viewed directly (or by specular reflection) from the vantage point of the camera (including the camera's light source, if any, and light sensor).

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

A "phased array" includes a sensor array that can be used to detect relative time differences of arrival in multipath signal transport from a point source of the signal. A non-limiting example of a "phased array" is a sensor array that can be used to detect relative time differences of arrival in multipath light transport from a point source of light. Another non-limiting example of a "phased array" is a sensor array which is configured so that, in any single frame captured by the sensor array, light captured at different elements in the array took different amounts of time to travel from the point source to the array, because the light captured at the different elements took different light paths from the point source to the array. The term"phased array" is not limited to light. For example, a "phase array" may detect another type of signal, including sound.

A "space time impulse response" or "STIR" means (a) a function that describes a response (over at least time and a dimension of space) of a system to an impulse, or (b) a set of data from which such a function may be extracted or estimated. For example: (i) the impulse may comprise an impulse of a light, and (ii) the function may be irradiance incident on a sensor (or any other measure of or related to intensity, energy power or flux of light) as a function of at least position and time. Or for example, the impulse may comprise an impulse of sound. Or, for example, the impulse may comprise an impulse of any other type of periodic signal. The number of dimensions of a STIR may vary depending, for example, on the number of spatial dimensions and on whether other dimensions are included.

Two values are "substantially" equal if they differ by less than 10%.

Two values differ "substantially" if they differ by 10% or more. Two values differ by a certain percent, if $[(x-y)/x] \times 100$ equals that certain percent, where x is the larger of the two values and y is the smaller of the two values.

A first point is "visible" to a second point if the point can be seen (directly or by specular reflection) from the vantage of the second point. For example, an object is "visible" to a sensor if the object can be seen (directly or by specular reflection) from the vantage point of the sensor.

Variations

This invention may be implemented in many different ways. Here are some non-limiting examples.

This invention is not limited to visible light, but may use electromagnetic radiation of any frequency. For example, illumination source 101 may emit electromagnetic radiation with frequencies approximately in the millimeter, terrahertz, visible, or radar range of frequencies.

This invention is not limited to electromagnetic radiation, but may use any type of signal, including a periodic signal. For example, the signal may comprise sound, including ultrasound (e.g., sound with a frequency greater than 20 kilohertz).

For a prototype of this invention, tests were run in two dimensional flatland. To extend this technique to three dimensions, more points on the jointly observable object may be sampled to constrain the reconstruction.

In a prototype, this invention tracks one moving target using pose information in a static scene. Alternately, the technique disclosed above may be combined with, say, particle filtering to track multiple targets with overlapping paths.

In a prototype of this invention, a camera with pico-second time resolution can be used to created reconstructions that accurate to within a centimeter. Alternately, a time-of-flight camera with a larger time resolution can be used, at the cost of poorer spatial resolution.

Coding in time and space can be used to disambiguate overlapping streaks (similar to coded exposure and coded aperture approaches in computational photography).

In exemplary implementations, this invention has many practical applications, such as detecting oncoming vehicles while turning, sensing room occupants during search and rescue, and monitoring moving machinery in close quarters.

This invention may be implemented as apparatus comprising in combination: (a) an illumination source for emitting light that travels from the illumination source to an object by diffuse reflection, (b) a sensor for taking measurements of light that travels from the object to the sensor by diffuse reflection from a surface, which sensor includes a phased array, and (c) one or more processors for calculating (based at least in part on the measurements) motion or size of the object, which object is visible to neither the sensor nor the illumination source. Furthermore: (1) the illumination source may be a laser; (2) the illumination source may be adapted to emit pulses of light, each pulse lasting for less than one nanosecond; (3) the sensor may be a streak camera; and (4) in each frame of the measurements, respectively, at least some light detected at different elements in the phased array may be diffusely reflected from different points in the surface, respectively.

This invention may be implemented as a method comprising, in combination: (a) using an illumination source and a sensor to gather measurements of light from a scene, which scene includes an object, and (b) using one or more processors to calculate (based at least in part on the measurements) a STIR, and to estimate (based at least in part on the STIR) motion or size of the object, in which method the object is visible to neither the illumination source nor the sensor, and light travels from the illumination source to the object by diffuse reflection, and from the object to the sensor by diffuse reflection from a surface. Furthermore: (1) the illumination source may be a laser; (2) the illumination source may emit pulses of light, each pulse lasting for less than one nanosecond (3) the sensor may be a streak camera; (4) the one or more processors may analyze a STIR that has extrema, and backproject the extrema to compute an upper bound on the size of the object; (5) the one or more processors may subtract one frame captured by the sensor from another frame captured by the sensor to calculate a STIR attributable to the object, and the object may be moving relative to the sensor at the time of the one frame and the other frame; (6) the one frame may be immediately before or immediately after the other frame; (7) the one frame may be neither immediately before nor immediately after the other frame; (8) the object may be in a first position in the first frame and a second position in the second frame, and the one or more processors may segment the STIR attributable to the object into a STIR attributable to the object in the first position and another STIR attributable to the object in the second position; and (9) the one or more processors may estimate position of the object by calculations that include a constrained least squares calculation.

This invention may be implemented as a method comprising in combination: (a) using a signal source to emit a pulsed signal that travels from the signal source to an object by diffuse reflection, and then from the object to a sensor by diffuse reflection, (b) using a phased array in the sensor to take measurements of the signal, and (c) using one or more processors to calculate (based at least in part on the measurements) motion or size of the object, which object is not visible to either the sensor or the signal source. Furthermore: (a) the signal may comprise light; (b) the signal source may emit pulses of light, each pulse lasting for less than one nanosecond, (c) the signal may comprise sound, and (d) the signal may have a frequency greater than 20 kilohertz.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. Apparatus comprising in combination:
   (a) a sensor for taking measurements of light that has traveled from an illumination source, then to a diffusely reflective surface, then to a moving object, then to the diffusely reflective surface, and then to the sensor, such that the measurements are taken when the moving object is moving relative to the sensor and to the illumination source and is visible to neither the sensor nor the illumination source;
   (b) the illumination source for emitting the light; and
   (c) one or more processors for calculating, based at least in part on the measurements, motion or size of the moving object;
   wherein the sensor includes a phased array.

2. The apparatus of claim 1, wherein the illumination source is a laser.

3. The apparatus of claim 1, wherein the illumination source is adapted to emit pulses of light, each pulse lasting for less than one nanosecond.

4. The apparatus of claim 1, wherein the sensor is a streak camera.

5. The apparatus of claim 1, wherein:
   (a) the measurements are taken in multiple frames; and
   (b) in each frame of the measurements, respectively, at least some light detected at different elements in the phased array diffusely reflected from different points in the surface, respectively.

6. A method comprising, in combination:
   (a) using an illumination source and a sensor to gather measurements of light from a scene, which scene includes a moving object that is moving relative to the illumination source and the sensor; and
   (b) using one or more processors
      to calculate, based at least in part on the measurements, a STIR,
      and to estimate, based at least in part on the STIR, motion or size of the moving object,
   in which method
   (i) the moving object is visible to neither the illumination source nor the sensor, and
   (ii) light travels from the illumination source to a diffusely reflective surface, then to the moving object, then to the diffusely diffusive surface, and then to the sensor.

7. The method of claim 6, wherein:
   (a) the sensor is a streak camera; and
   (b) the streak camera records a banana-shaped streak profile that comprises multiple arcs.

8. The method of claim 7, wherein the method includes calculating a point cloud of backprojections of the arcs.

9. The method of claim 6, wherein the one or more processors estimate the size of the moving object, which size is the width of a layer of the moving object.

10. The method of claim 6, wherein the one or more processors:
    (a) compute a STIR that has extrema, and
    (b) backproject the extrema to compute an upper bound on the size of the moving object.

11. The method of claim 6, wherein:
    (a) the one or more processors subtract one frame captured by the sensor from another frame captured by the sensor to calculate a STIR attributable to the moving object; and
    (b) the object is moving relative to the sensor at the time of the one frame and the other frame.

12. The method of claim 11, wherein the one frame is immediately before or immediately after the other frame.

13. The method of claim 11, wherein the one frame is neither immediately before nor immediately after the other frame.

14. The method of claim 11, wherein:
    (a) the moving object is in a first position in the first frame and a second position in the second frame; and
    (b) the one or more processors segment the STIR attributable to the object into a STIR attributable to the object in the first position and another STIR attributable to the object in the second position.

15. The method of claim 6, wherein the one or more processors estimate position of the moving object by calculations that include a constrained least squares calculation.

16. A method comprising in combination:
    (a) using a signal source to emit a pulsed signal that reflects from a moving object, then reflects from a surface other than the moving object, and then travels to a sensor;
    (b) using a phased array in the sensor to take measurements of the signal; and
    (c) using one or more processors to calculate, based at least in part on the measurements, motion or size of the moving object;
    wherein the moving object is moving relative to the sensor and signal source and is visible to neither the sensor nor the signal source.

17. The method of claim 16, wherein the signal comprises light.

18. The method of claim 16, wherein:
    (a) the sensor is a streak camera; and
    (b) the streak camera records a banana-shaped streak profile that comprises multiple arcs.

19. The method of claim 16, wherein the signal comprises sound.

20. The method of claim 18, wherein the method includes calculating a point cloud of backprojections of the arcs.

* * * * *